US012697818B2

(12) United States Patent
Newell et al.

(10) Patent No.: US 12,697,818 B2
(45) Date of Patent: Aug. 4, 2026

(54) CONTINUOUS INKJET PRINTER

(71) Applicant: Linx Printing Technologies Limited, St Ives (GB)

(72) Inventors: Simon Peter Jason Newell, Cambridgeshire (GB); Stephen Eric Baldwin, Cambridgeshire (GB)

(73) Assignee: Linx Printing Technologies Limited, St Ives (GB)

(*) Notice: Subject to any disclaimer, the term of this patent is extended or adjusted under 35 U.S.C. 154(b) by 150 days.

(21) Appl. No.: 18/554,797

(22) PCT Filed: Apr. 12, 2022

(86) PCT No.: PCT/GB2022/050908
§ 371 (c)(1),
(2) Date: Oct. 11, 2023

(87) PCT Pub. No.: WO2022/219317
PCT Pub. Date: Oct. 20, 2022

(65) Prior Publication Data
US 2024/0198690 A1 Jun. 20, 2024

(30) Foreign Application Priority Data
Apr. 12, 2021 (GB) ..................................... 2105172

(51) Int. Cl.
*B41J 2/185* (2006.01)
*B41J 2/02* (2006.01)
(Continued)

(52) U.S. Cl.
CPC ................. *B41J 2/185* (2013.01); *B41J 2/02* (2013.01); *B41J 2/04563* (2013.01);
(Continued)

(58) Field of Classification Search
CPC ....... B41J 2/185; B41J 2/02; B41J 2/18; B41J 2/1721; B41J 2/1714; B41J 2/04563;
(Continued)

(56) References Cited

U.S. PATENT DOCUMENTS

| | | | |
|---|---|---|---|
| 2010/0220128 | A1 | 9/2010 | Zaba et al. |
| 2011/0001771 | A1 | 1/2011 | Heylen et al. |

(Continued)

FOREIGN PATENT DOCUMENTS

| | | |
|---|---|---|
| GB | 2337961 | 12/1999 |
| WO | 2016205173 | 12/2016 |
| WO | 2022219317 | 10/2022 |

OTHER PUBLICATIONS

"Further Search Report for GB Application 2105172.7", Apr. 6, 22, 2 pages.

(Continued)

*Primary Examiner* — Kristal Feggins
(74) *Attorney, Agent, or Firm* — DeLizio, Peacock, Lewin & Guerra LLP

(57) ABSTRACT

A continuous inkjet printer is provided comprising an ink supply system, a droplet generator configured to receive ink from the ink supply system and to produce a jet of ink for printing, a gutter configured to receive parts of the jet that are not required for printing, a gutter line connected to the gutter and configured to return unprinted ink to the ink supply system, a suction system comprising a Venturi having a suction port configured to apply a suction force to the gutter line, and a gutter flow rate control system configured to control a rate of flow of fluid along the gutter line based on temperature.

23 Claims, 9 Drawing Sheets

Figure 1:
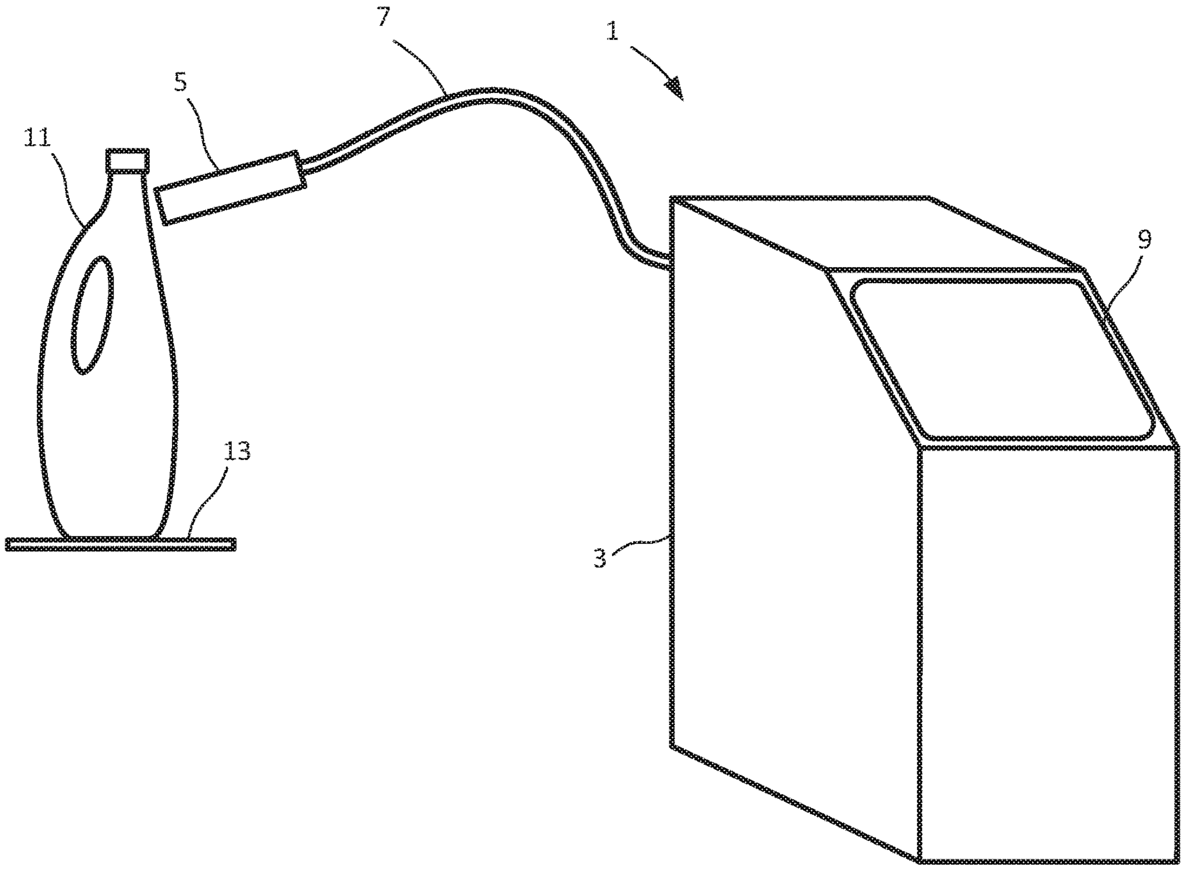

(51) Int. Cl.
*B41J 2/045* (2006.01)
*B41J 2/14* (2006.01)

(52) U.S. Cl.
CPC ...... *B41J 2/14072* (2013.01); *B41J 2002/022* (2013.01); *B41J 2002/1853* (2013.01)

(58) Field of Classification Search
CPC .............. B41J 2/14072; B41J 2002/022; B41J 2002/1853; B41J 2002/1742; B41J 2002/1735; B41J 2002/1728; B41J 2/17596
See application file for complete search history.

(56) References Cited

U.S. PATENT DOCUMENTS

| | | | |
|---|---|---|---|
| 2011/0109684 | A1 | 5/2011 | Tomlin et al. |
| 2015/0138285 | A1 | 5/2015 | Tomlin et al. |
| 2017/0144448 | A1 | 5/2017 | Smith |
| 2020/0001610 | A1 | 1/2020 | Briggs |
| 2020/0316958 | A1 | 10/2020 | Walkington et al. |

OTHER PUBLICATIONS

"International Preliminary Report on Patentability issued in related PCT Application No. PCT/GB2022/050908", Jun. 10, 2023, 8 pages.
"Search Report and Written Opinion issued for PCT Application PCT/GB2022/050908", Jul. 8, 2022, 9 pages.
"Search Report issued for GB Application GB2105172.7", Sep. 27, 2021, 1 page.

CONTINUOUS INKJET PRINTER

The present invention relates to inkjet printing and more particularly to a continuous ink jet printer and a method of operating the same. More particularly, but not exclusively, the present invention relates to a gutter flow rate control system for use in a continuous ink jet printer.

In inkjet printing systems the print is made up of individual droplets of ink generated at a nozzle and propelled towards a substrate. There are two principal inkjet printing systems: drop on demand where ink droplets for printing are generated as and when required; and continuous inkjet printing in which droplets are continuously produced and only selected ones are directed towards the substrate, the others being recirculated to an ink supply.

Continuous ink jet printers, such as electrostatic deflection continuous ink jet printers, are a form of industrial printer commonly used to apply markings to products passing along a production line. For example, packaged products may be marked with a batch code or a date indicating the date of manufacture, or a date of expiry. Such printers may be operated for batch production or in a continuously operating environment, where production continues at all times. Such printers may be required to run for extended periods of time with minimal interruption to printing.

Continuous inkjet printers supply pressurised ink to a print head drop generator (or ink gun) where a continuous stream of ink emanating from a nozzle is broken up into individual regular drops by, for example, an oscillating piezoelectric element. The drops are directed past a charge electrode where they are selectively and separately given a predetermined charge before passing through a transverse electric field provided between a pair of deflection plates. Each charged drop is deflected by the field by an amount that is dependent on its charge magnitude before impinging on the substrate whereas the uncharged drops proceed without deflection and are collected at a gutter from where they are recirculated to the ink supply for reuse. The charged drops bypass the gutter and hit the substrate at a position determined by the charge on the drop and the position of the substrate relative to the print head. Typically the substrate is moved relative to the print head in one direction and the drops are deflected in a direction generally perpendicular thereto, although the deflection plates may be oriented at an inclination to the perpendicular to compensate for the speed of the substrate (the movement of the substrate relative to the print head between drops arriving means that a line of drops would otherwise not quite extend perpendicularly to the direction of movement of the substrate).

In continuous inkjet printing a character is conventionally printed from a matrix comprising a regular array of potential drop positions. Each matrix comprises a plurality of columns (strokes), each being defined by a line comprising a plurality of potential drop positions (e.g. seven) determined by the charge applied to the drops. Thus each usable drop is charged according to its intended position in the stroke. If a particular drop is not to be used then the drop is not charged and it is captured at the gutter for recirculation. This cycle repeats for all strokes in a matrix and then starts again for the next character matrix.

Ink is delivered under pressure to the print head by an ink supply system that is generally housed within a sealed compartment of a cabinet that includes a separate compartment for control circuitry and a user interface panel. The system includes a main pump that draws the ink from a tank of the ink supply system via a filter and delivers it under pressure to the print head. As ink is consumed the tank is refilled as necessary from a replaceable ink cartridge that is releasably connected to the tank by a supply conduit. The ink is fed from the tank via a flexible delivery conduit to the print head. The unused ink drops captured by the gutter are recirculated to the tank via a return conduit by a pump. The flow of ink in each of the conduits is generally controlled by solenoid valves and/or other like components.

As the ink circulates through the system, there is a tendency for it to thicken as a result of solvent evaporation, particularly in relation to the recirculated ink that has been exposed to air in its passage between the nozzle and the gutter, and air that is vented from the ink system to maintain equilibrium pressure. In order to compensate for this, "make-up" solvent is added to the ink as required from a replaceable solvent cartridge so as to maintain the ink viscosity within desired limits.

In some circumstances, the loss of solvent from the ink supply system, and its subsequent replacement, can represent a significant cost, and source of environmental contamination. That is, venting of solvent vapour into a production environment may be undesirable and may place significant environmental health restrictions on the environment. For example, additional ventilation and/or environmental monitoring may be required in order to mitigate the risks associated with vented solvents.

This solvent may also be used for flushing components of the print head, such as the nozzle and the gutter, in a cleaning cycle. Therefore, a typical continuous inkjet printer has both a replaceable ink cartridge and a replaceable solvent cartridge.

Various types of inks may be used within the continuous inkjet printers. The ink may include various organic solvents or solvent mixtures. Inks may contain different types of colourant. The ink composition may vary independence upon various characteristics, such as the colour required, the surface onto which printing is to be performed, solvents which are suitable for a particular application environment, and many other factors.

It is an object of the present invention, among others, to provide a continuous ink jet printer which obviates or mitigates one or more problems associated with known continuous ink jet printers, whether described herein, or otherwise.

According to a first aspect of the present disclosure there is provided a continuous inkjet printer comprising an ink supply system, a droplet generator configured to receive ink from the ink supply system and to produce a jet of ink for printing, a gutter configured to receive parts of the jet that are not required for printing, a gutter line connected to the gutter and configured to return unprinted ink to the ink supply system, a suction system comprising a Venturi having a suction port configured to apply a suction force to the gutter line, and a gutter flow rate control system configured to control a rate of flow of fluid along the gutter line based on temperature.

By controlling the rate of flow of fluid along the gutter line based on temperature, the flow rate can be regulated so as to compensate for changes in flow rate that may occur due to changes in temperature. In this way, unnecessarily high flow rates can be reduced to reduce solvent loss at operating temperatures that are lower, while allowing sufficient flow to be maintained at higher temperatures to ensure that ink is reliably drawn into the gutter. The flow rate of fluid (e.g. fresh air drawn into the gutter opening) can be maintained at broadly a fixed level irrespective of temperature. The flow rate of fluid can be controlled so as to be (relatively) insensitive to temperature.

The rate of fluid flowing along a portion of the gutter flow line may be regulated. The rate of flow of fluid along the gutter line may be controlled to compensate for the effect of changes in temperature of fluid flowing within the Venturi.

The gutter flow rate control system may be configured to cause the suction system to operate in a first suction configuration (e.g. a high power configuration) at a first (e.g. high) temperature, and to operate in a second suction configuration (e.g. a reduced power configuration) at a second (e.g. low) temperature, the first temperature being higher than the second temperature.

The first suction configuration and the second suction configuration may be configured such that if the suction system was caused to operate in the first suction configuration at the second temperature, the rate of flow of fluid along the gutter would be greater than the rate of flow of fluid along the gutter when the suction system is caused to operate in the second suction configuration at the second temperature.

It will be understood that the rate of flow of fluid along the gutter for a given suction configuration may vary based upon many factors, such as, for example, temperature, printing rate, ink type, printhead orientation, etc. The comparison between the first suction configuration and the second suction configuration is intended to demonstrate the differences in gutter flow rate between two otherwise equivalent situations. That is, if all other conditions were equal, then at a given temperature (e.g. the second temperature), the first suction configuration would cause a greater gutter flow rate than the second suction configuration. Moreover, while a comparison is provided relating to the difference between the first and second configurations, when operating at the second temperature, it will be understood that in operational circumstances, the suction system would generally be caused to operate in the second suction configuration. That is, the hypothetical situation in which the suction system is caused to operate in the first suction configuration at the second temperature is provided purely to provide a comparative example. By providing multiple configurations intended for use at different temperatures, it is possible to "turn down" the gutter suction rate, to avoid or reduce excess suction (and consequential excess solvent loss).

In other words, when operating at a given temperature within a normal operating range of the printer, a first suction configuration may be configured to cause the rate of flow of fluid along the gutter to be greater than the rate of flow of fluid along the gutter caused by the suction system operating in a second suction configuration. The gutter flow rate control system may thus be configured to cause the suction system to operate in the first suction configuration at a first temperature, and to operate in the second suction configuration at a second temperature, the second temperature being lower than the first temperature.

A characteristic exists for each suction configuration (e.g. the first suction configuration, the second suction configuration, etc.) which relates temperature and gutter flow rate. In each case, the characteristic exhibits a trend in which the gutter flow rate reduces as temperature increases (where other variables remain unchanged).

The first and second temperatures may be temperatures indicative of the temperature of ink flowing within the Venturi. For example, temperature data may be obtained that is indicative of the temperature of ink flowing within the Venturi, the obtained temperature data then being used to select an appropriate configuration of the suction system. That is, the gutter flow rate control system may be configured to control the suction system to select between the first suction configuration and the second suction configuration based on the temperature data. Third (or further suction configurations may be provided for use at further temperatures. A preferred operating temperature range may exist for each configuration.

Whereas it had previously been understood that increased gutter suction was required at lower temperatures in order to overcome increased ink viscosity, it has been realised that it may in fact be preferred to reduce the suction at lower temperatures (compared to the situation when no configuration changes are made between temperatures), thereby avoiding excess suction, and associated excess solvent loss.

The gutter flow rate control system may comprise a controllable fluid path having a plurality of fluid path configurations.

Each of the plurality of fluid path configurations may be referred to as a suction system suction configuration.

By providing a controllable fluid path, the suction level at the gutter can be adjusted, thereby adjusting the gutter flow rate. Each of the different configurations may correspond to a different setting (e.g. temperature) and may result in a different gutter flow rate reduction.

The different configurations may comprise different restriction levels within a single path, and/or different path configurations.

Each one of said plurality of fluid path configurations may correspond to a different gutter flow rate reduction.

The gutter flow rate control system may be configured to select one of the plurality of suction configurations based upon the temperature. Such a selection may be made in order to reduce excess gutter flow rate. That is, the selection may be made so as to select a configuration which provides a sufficient, but not excessive, gutter flow rate.

The selection may be made so as to cause the gutter flow rate to fall within an acceptable gutter flow rate range during normal printing operations. That is, when a printer is under normal operating conditions (e.g. with a jet of ink being emitted by the droplet generator for printing, and a majority of the jet being received by the gutter), the gutter flow rate control system may be configured to control the suction system to maintain the gutter flow rate above a minimum acceptable level, and to reduce the excess gutter flow rate above that minimum level.

The gutter flow rate control system may be configured to control the suction system to cause the gutter flow rate to have a gutter flow rate within a target gutter flow rate range. The target gutter flow rate range may comprise a minimum gutter flow rate. The gutter flow rate control system may be configured to control the suction system to cause the gutter flow rate to not drop below the minimum gutter flow rate, and to minimise an excess gutter flow rate above the minimum gutter flow rate. The minimum gutter flow rate may be dependent on various system parameters, such as, for example, printhead orientation, ink type, humidity level, etc.

Each one of said plurality of fluid path configurations may correspond to a different rate of flow of fluid along the gutter line for a given temperature. That is, the different gutter flow rate reduction for each configuration may provide a different reduction as compared to a normal or default gutter flow rate for a given temperature. In use, each of the different fluid path configurations may result in (or may be intended to result in) a similar gutter flow rate.

The controllable fluid path may be configured to allow fluid to flow to a suction port of the Venturi. Fluid may be configured to pass directly to the suction port, or into another line (e.g. the gutter line) connected to the suction port.

In this way, additional fluid can be provided to the suction port, which has the effect of restricting the strength of vacuum force felt at the gutter opening, and therefore the rate of fluid drawn into the gutter opening.

The Venturi may comprise a plurality of suction ports. A first one of the plurality of suction ports may be connected to the gutter line. A second one of the plurality of suction ports may be connected to the controllable fluid path.

The suction port may be the same or a different suction port as that which is connected to the gutter line.

Alternatively, a restriction in the gutter line can be used to reduce the gutter flow rate. That is, the controllable fluid path may comprise a controllable restriction in the gutter line.

According to a second aspect of the present disclosure there is provided a continuous inkjet printer comprising an ink supply system, a droplet generator configured to receive ink from the ink supply system and to produce a jet of ink for printing, a gutter configured to receive parts of the jet that are not required for printing, a gutter line connected to the gutter and configured to return unprinted ink to the ink supply system, a suction system comprising a Venturi having a suction port configured to apply a suction force to the gutter line, and a gutter flow rate control system configured to control a rate of flow of fluid along the gutter line. The gutter flow rate control system comprises a controllable fluid path configured to allow ink to flow to a location in fluid communication with a suction port of the Venturi.

The gutter flow rate control system may be configured to control the rate of flow of fluid along the gutter line based on temperature.

The controllable fluid path may have a plurality of fluid path configurations. Each of the different configurations may correspond to a different setting (e.g. temperature) and may result in a different gutter flow rate reduction. The different configurations may comprise different restriction levels within a single path, and/or different path configurations.

Each one of said plurality of fluid path configurations may correspond to a different gutter flow rate reduction.

Fluid may be configured to pass directly to the suction port, or into another line (e.g. the gutter line) connected to the suction port. In this way, additional fluid can be provided to the suction port, which has the effect of restricting the strength of vacuum felt at the gutter opening, and therefore the rate of fluid drawn into the gutter opening.

The Venturi may comprise a plurality of suction ports. A first one of the plurality of suction ports may be connected to the gutter line. A second one of the plurality of suction ports may be connected to the controllable fluid path.

The suction port may be the same or a different suction port as that which is connected to the gutter line.

Such a gutter flow rate control system may be referred to as an ink feedback system.

The controllable fluid path may be in addition to the gutter line. That is, the flow of ink to the location in fluid communication with the suction port of the Venturi may be in addition to, and separate from, any ink received by the gutter. The controllable fluid path and the gutter line may join at or before a common suction port of the Venturi, or may each be connected to separate suction ports of the Venturi. In this way, while the Venturi may receive one or two different fluid flows depending on the port configuration, in each case, two different fluid paths are provided. The controllable fluid path may itself comprise a plurality of fluid paths. As such more than two fluid paths may be provided to a suction port (or suction ports) of the Venturi.

The following features may be provided (individually or in any combination) with the printer described above in the context of either of the first of second aspects of the present disclosure.

The controllable fluid path may be configured to allow fluid to flow from a first location within the printer to a second location in fluid communication with the suction port of the Venturi.

The first location may be a location within the printer within an ink recirculation path. That is, the first location may be a location where ink is continuously (or at least continuously during normal operation) flowing along an ink recirculation path.

The fluid may comprise ink. Such a gutter flow rate control system may be referred to as an ink feedback system.

The fluid may comprise gas, such as for example air and/or solvent vapour. The fluid may comprise a mixture of ink and air.

The first location may be a location within the ink supply system.

The first location may be a location within the ink supply system substantially at atmospheric pressure.

The first location may be a location within the ink supply system within an ink recirculation path. For example, the first location may be a location other than an ink cartridge (or supply line connected directly to an ink cartridge), since such a location will contain a limited ink supply, and may, at times, be empty. On the other hand, many locations within the ink supply system contain ink that is continually replenished due to ink recirculation (e.g. via a gutter line and/or Venturi).

The first location may be selected from one of: the output of the Venturi to the suction port; an ink supply tank of the printer; an ink supply line configured to transport ink from the ink supply tank to the droplet generator; and the droplet generator assembly.

The second location may be selected from the suction port of the Venturi and the gutter return line between the gutter and the suction port.

The controllable fluid path may be configured to allow fluid to enter the gutter return line between the gutter and the suction port.

The controllable fluid path may be configured to allow fluid to enter the gutter return line between the gutter and the suction port at a location within a printer housing.

The controllable fluid path may be configured to allow fluid to flow from the output of the Venturi to the suction port.

By allowing fluid to flow from the output of the Venturi, it is not necessarily required that fluid flows directly from the output of the Venturi. Rather, fluid could flow from the output of the Venturi via an outlet tube (e.g. towards an ink supply tank within the ink supply system), with another tube provided to allow some of the fluid to be diverted to the suction port. The output of the Venturi may be referred to as the first location within the ink supply system. The suction port may be referred to as the second location.

The printer may comprise an ink supply tank. The controllable fluid path may be configured to allow fluid to flow from the ink supply tank to the suction port.

The ink supply tank may be contained within a housing of the printer and may be configured to receive the output of the Venturi (which comprises ink, entrained air introduced through the gutter, and solvent).

The fluid allowed to flow from the ink supply tank may comprise ink and/or air. The air may comprise solvent vapour.

The printer may comprise an ink supply tank and an ink supply line configured to transport ink from the ink supply tank to the droplet generator. The controllable fluid path may be configured to allow fluid to flow from the ink supply line to the suction port.

The ink supply line may pass from the ink supply tank to an ink pump configured to supply ink to the droplet generator. The controllable fluid path may be configured to allow fluid to flow from an ink supply line supplying ink from the ink supply tank to an ink pump to said suction port.

The controllable fluid path may be configured to allow fluid to flow from the ink supply line after an output of an ink pump to the suction port.

The ink pump may be configured to supply ink to the droplet generator. Some (e.g. a small proportion) of the ink which has been pumped by the ink pump can be provided to the suction port where it will have the effect of restricting the suction pressure felt at the gutter, thereby reducing the gutter flow rate.

The controllable fluid path may be configured to allow fluid to flow from the droplet generator, or droplet generator assembly, to a suction port.

The controllable fluid path may be configured to allow fluid to flow from a purge line configured to transport ink from a purge port of the droplet generator to the ink supply tank. A controllable valve may be provided within the purge line.

The controllable fluid path may be configured to allow fluid to flow from an assembly comprising the droplet generator to the suction port. The assembly (i.e. a droplet generator assembly) may comprise the droplet generator (which includes a body having known acoustic properties and a nozzle), a piezoelectric oscillator, and a purge port. The purge port may be provided by the body.

The controllable fluid path may be configured to allow air to flow from a location within the ink system to the suction port.

Air could be provided (i.e. fed-back) from a location within the ink supply tank, or a vent from the ink supply tank. Such air would contain a significant portion of solvent vapour, so would not introduce additional “fresh” air to the ink system, yet could still allow the gutter flow rate to be reduced when required. Such a gutter flow rate control system may be referred to as an air feedback system.

The air may be allowed to flow to a location within the gutter line between the suction port and the umbilical. That is, the junction between the air recirculation line and the gutter line may be provided within the printer housing, rather than within the printhead.

The gutter flow rate control system may comprise a controllable flow restrictor configured to vary a restriction in the gutter line between the gutter and the suction port of the Venturi.

That is, rather than (or even in addition to) introducing additional controllable fluid paths, it is possible to restrict the gutter line to controllably reduce the flow rate along the gutter line. In this way, the existing gutter flow path can be controlled to form a controllable fluid path.

Such a gutter flow rate control system may be referred to as a gutter restriction control system.

The gutter flow rate control system may be configured to control the suction force generated by the suction system to control the rate of flow of fluid along the gutter line.

That is, rather than (or as well as) varying the amount of a generated suction force that is exposed to the gutter line, the level of suction force itself may be varied at the source (e.g. by varying the operation of one or more Venturis within the suction system).

The gutter flow rate control system may be configured to control the suction force generated by the suction system to control the rate of flow of fluid along the gutter line based upon temperature.

According to a third aspect of the present disclosure, there is provided a continuous inkjet printer comprising an ink supply system; a droplet generator configured to receive ink from the ink supply system and to produce a jet of ink for printing; a gutter configured to receive parts of the jet that are not required for printing; a gutter line connected to the gutter and configured to return unprinted ink to the ink supply system; a suction system comprising a Venturi having a suction port configured to apply a suction force to the gutter line; and a gutter flow rate control system. The gutter flow rate control system is configured to control the suction force generated by the suction system to control the rate of flow of fluid along the gutter line.

Such a gutter flow rate control system may be referred to as a Venturi modulation system.

The following features may be combined with any of the continuous inkjet printers described above with reference to the first, second and third aspects (in particular, printers comprising a gutter flow rate control system controlled based on temperature, a gutter flow rate control system in which ink is provided to a suction port of the Venturi, or a gutter flow rate control system in which the suction force generated by the suction system is controlled).

The Venturi may define a primary ink flow path from a Venturi inlet to a Venturi outlet. The suction force generated at the suction port may have a predetermined relationship with the rate of ink flow along the primary ink flow path. The gutter flow rate control system may be configured to control the rate of ink flow along the primary ink flow path.

The gutter flow rate control system may comprise a controllable flow restriction provided upstream of the Venturi inlet.

The controllable flow restrictor may comprise a variable flow restriction (e.g. continuously variable flow restriction, such as a needle valve), or a plurality of discrete flow rate restrictions. The controllable flow restriction may be referred to as a controllable fluid path.

The controllable flow restriction may comprise a plurality of fluid path configurations, each configuration providing a different primary ink flow path restriction.

The suction system may comprise a second Venturi configured to apply a second suction force to the gutter line; wherein the gutter flow rate control system is configured to control the suction force applied to the gutter line by at least one of the Venturi and the second Venturi.

The two (or more) Venturis could be controlled independently of each other to controllably apply suction force to the gutter line. In this way, the level of suction force may be varied at the source (e.g. by which of the Venturis contribute to the suction force exerted on the gutter line.)

The gutter flow rate control system may comprise a first configuration in which the suction port of the Venturi is coupled to the gutter line and a second suction port of the second Venturi is not coupled to the gutter line, and a second configuration in which the second suction port of the second Venturi is coupled to the gutter line and the suction port of the Venturi is not coupled to the gutter line.

In each of the first and second configurations, the other one of the suction ports may be disconnected from the gutter line. In this way, different suction forces can be applied by varying the gutter line configuration, but without adjusting the primary ink flow through the Venturis, thereby minimising possible disruption to the stability of the ink flow supplied to the nozzle.

In a third configuration, both of the suction ports may be coupled to the gutter line.

The gutter flow rate control system may be configured to selectively prevent ink from flowing through at least one of the Venturi and the second Venturi.

In this way, the gutter suction level can be reduced by disabling one or other of the Venturis.

The controllable fluid path may comprise a plurality of separately controllable sub-paths.

Sub-paths may also be referred to as path segments or parts, or as path portions. The controllable fluid path may be made up of several sub-paths or path portions that a can be combined in a variety of ways (or configurations) in order to provide the full path.

The controllable fluid path may comprise three separately controllable sub-paths.

At least two of the plurality of separately controllable sub-paths may be configured in parallel.

Each of the separately controllable sub-paths may be independently controlled (e.g. switched between an open and closed state), allowing different combinations of sub-paths to be used, thereby providing a plurality of different fluid path configurations. Each of the separately controllable sub-paths may comprise a respective make-break valve.

The controllable fluid path may comprise three separately controllable parallel sub-paths.

Each of the plurality of separately controllable sub-paths comprises a different flow restriction.

The flow restriction of each sub-path may be determined by a diameter and/or length of a bore of narrower diameter than a line connected thereto. The diameter and/or length of each restriction may be selected to provide a predetermined set of possible restriction configurations of the controllable path.

The controllable fluid path may comprise three separately controllable parallel sub-paths, each having a different flow rate restriction. A flow rate restriction may comprise a bore having a precisely controlled diameter and/or length. Alternatively, a flow rate restriction may comprise a length of tube. That is, a flow rate restriction may simply comprise a (relatively long) length of tubing having the same (or similar) diameter as other tubing used within the printer, but of sufficient length to provide a measurable restriction level.

The controllable fluid path comprises at least one valve configured to switch between an open state where the controllable fluid path has a first configuration and a closed state where the controllable fluid path has a second configuration.

Such a valve (i.e. one having an “open” or “closed” state) may be referred to as a two port valve, a 2/2 valve, or a “make-break” valve.

The controllable fluid path may comprise at least one multi-way valve configured to cause fluid to flow along a first fluid path portion where the controllable fluid path has a third configuration or a second fluid path portion where the controllable fluid path has a fourth configuration.

By using a multi-way valve (e.g. 3/2 valve), it is possible to efficiently select between different fluid path configurations.

The rate of flow of fluid along the gutter line may be controlled based on a temperature of fluid flowing within the Venturi.

The rate of flow of fluid along the gutter line may be controlled based on a predetermined relationship between the temperature of fluid flowing within the Venturi and the suction force generated by the Venturi.

The predetermined relationship may be determined during calibration operations, or by modelling, and may be stored in the printer, with an appropriate configuration of the gutter flow rate control system determined based on temperature, with reference to the stored relationship.

The rate of flow of fluid along the gutter line may be controlled based on temperature data.

The temperature data may be data indicative of the temperature of the fluid flowing within the Venturi. The data indicative of the temperature of the fluid flowing within the Venturi may be directly determined (e.g. by an appropriately arranged sensor) or may be indirectly determined (e.g. by obtaining data from one or more alternative sources, and generating said data indicative of the temperature based upon the obtained data according to a known relationship.

The continuous inkjet printer may further comprise a temperature sensor configured to generate a signal indicative of temperature, said temperature data being generated based upon said signal.

The temperature sensor may be configured to generate a signal indicative of a temperature of the ink within the printer. The temperature sensor may be configured to generate a signal indicative of a temperature of the ink within the Venturi.

The temperature sensor may be configured to generate a signal indicative of a temperature of the ink at the droplet generator. The temperature sensor may be configured generate a signal indicative of a temperature of components of the printer ink system. The temperature sensor may be configured to generate a signal indicative of a temperature within a housing containing components of the printer (e.g. one or more of: control electronics, ink supply system, ink pump, ink storage tank, ink cartridge, solvent cartridge).

The temperature sensor may be configured to measure an ambient temperature proximate to the printer.

The gutter flow rate control system may be configured to obtain temperature data indicative of a temperature at a first location (e.g. an ambient temperature, or a temperature at a location within the printer housing) and to process said temperature data based on a stored relationship to generate data indicative of an ink temperature. The stored relationship may comprise offset and/or calibration data which allows the temperature at the first location to be mapped to ink temperature.

The gutter flow rate control system may be configured to have a first configuration when a predetermined condition is satisfied, and to have a second configuration when the predetermined condition is not satisfied.

The predetermined condition may be based on one or more operating characteristics (e.g. temperature, viscosity, fault conditions, etc.). The first configuration may be that a gutter flow rate reduction may be disabled (such that the gutter flow rate has a default high value). Thus if the condition is satisfied (e.g. if viscosity is too low, and/or if temperature is too low, and/or if a fault condition is present), active flow rate control may be disabled. On the other hand, if the predetermined condition is not satisfied, then the second configuration may be selected, and active flow rate control (e.g. based on temperature) may be performed. In the second configuration, one of several different sub-configurations (e.g. restriction level, or controllable flow path configurations may be selected).

The gutter flow rate control system may be configured to control a rate of flow of fluid along the gutter line based on ink data.

The ink data may be data indicative of a type of ink and/or a type of solvent contained within the ink. The type of ink may be useful to determine a characteristic of the Venturi (e.g. a relationship between suction force and ink flow rate). The determined characteristic can be used to select an appropriate control setting based on the temperature (e.g. ink temperature).

The gutter flow rate control system may be configured to control a rate of flow of fluid along the gutter line based on ink viscosity data.

The gutter flow rate control system may be configured to disable active flow rate control if the ink viscosity data satisfies a predetermined condition (e.g. viscosity is above or below a threshold, or is outside a predetermined viscosity range).

The gutter flow rate control system may be configured to control a rate of flow of fluid along the gutter line based on a system operating pressure.

The system operating pressure may be regulated. The ink pump may be configured to supply ink to the printhead at a predetermined system operating pressure. The system operating pressure may be determined based upon the printer configuration.

The gutter flow rate control system may be configured to control a rate of flow of fluid along the gutter line based on printer configuration data.

Printer configuration data may, for example, include one or more of: printhead orientation, printhead height, umbilical length. Printer configuration data may, for example, include system operating pressure data.

The gutter flow rate control system may be configured to control a configuration of the controllable fluid path based on data indicative of a rate of flow of fluid along the gutter line.

That is, feedback control may be provided, allowing the flow rate to be directly or indirectly monitored, and the monitored data used to control the configuration of the controllable fluid path.

The gutter flow rate control system may be configured to switch a configuration of the controllable fluid path between a first configuration and a second configuration at switching frequency, wherein a switching duty cycle is varied to control the rate of flow of fluid along the gutter line.

That is, a pulse width modulation (PWM) based control scheme may be used in order to regulate gutter flow rate. PWM may be applied to an ink feedback system, a gutter restriction control system, an air feedback system, or a Venturi modulation system.

The gutter flow rate control system may comprise a manual control interface.

The manual control interface may allow the gutter flow rate control system to be configured in a particular configuration. The manual control interface may allow a controllable fluid path to be configured to have a manually selected configuration (e.g. selected from a plurality of available fluid path configurations.

The manual control interface may allow automatic control (e.g. based on temperature, or one or more other variables) to be disabled or overridden.

The continuous inkjet printer may comprise a controller configured to control the gutter flow rate control system.

The continuous inkjet printer may further comprise a printhead operable to receive ink from the ink supply system for printing. The printhead may comprise said droplet generator and said gutter. The printhead may be connected to the ink supply system via an umbilical.

Said jet of ink may be a modulated jet of ink configured to form a stream of individual droplets. The gutter may be configured to receive droplets that are not required for printing.

The continuous inkjet printer may be an electrostatic deflection continuous inkjet printer configured to selectively charge ink droplets within the ink jet and to deflect charged droplets in an electrostatic field. The droplets may be selectively, and in some cases variably, charged with the charging of each particular droplet being determined based upon a pattern to be printed.

The continuous inkjet printer may further comprise at least one charge electrode configured to induce charge on ink droplets, and at least one deflection electrode configured to generate said electrostatic field.

The printhead may comprise said charge electrode. The printhead may comprise said at least one deflection electrode. The printhead may comprise two deflection electrodes.

The continuous inkjet printer may be configured to cause charged droplets to be deflected by an amount in order to strike a substrate at a desired printing location to print a pattern to be printed.

The continuous inkjet printer may be configured to allow uncharged droplets to travel to the gutter.

Unprinted ink droplets may be recirculated to the ink supply system.

The continuous inkjet printer may comprise an ink supply tank. The printer may comprise an ink supply line configured to transport ink from the ink supply tank to the droplet generator.

The continuous inkjet printer may comprise an ink pump configured to supply ink from the ink tank to the droplet generator. The ink pump may be further configured to supply ink from the ink tank to the Venturi. In this way, the gutter vacuum can be generated by the Venturi, with the (main) ink pump being operated to generate drive both the ink supply (at positive pressure) and the gutter vacuum (at negative pressure).

According to a further aspect of the present disclosure, there is provided a method of operating any of the continuous inkjet printers described above.

According to a further aspect of the present disclosure, there is provided a method of operating a continuous inkjet printer comprising an ink supply system, a droplet generator configured to receive ink from the ink supply system and to produce a jet of ink for printing, a gutter configured to receive parts of the jet that are not required for printing, a gutter line connected to the gutter and configured to return unprinted ink to the ink supply system, and a suction system comprising a Venturi having a suction port configured to apply a suction force to the gutter line.

According to a further aspect of the present disclosure, there is provided a method of operating a continuous inkjet printer. The method comprises supplying, by an ink supply system, ink to a droplet generator, receiving, by the droplet generator, ink from the ink supply system and producing, by the droplet generator, a jet of ink for printing. The method further comprises receiving, by a gutter, parts of the jet that are not required for printing. The method further comprises returning, by a gutter line connected to the gutter, unprinted ink to the ink supply system. The method further comprises, applying, by a suction port of a suction system comprising a Venturi, a suction force to the gutter line. The method further comprises controlling a rate of flow of fluid along the gutter line based on temperature.

The following features may be combined with any of the above described methods.

The method may comprise controlling a rate of flow of fluid along the gutter line based on temperature.

The suction system may have a first suction configuration, and a second suction configuration.

Controlling the rate of flow of fluid along the gutter line based on temperature may comprise causing the suction system to operate in the first suction configuration at a first temperature, and to operate in a second suction configuration at a second temperature, the first temperature being higher than the second temperature. The first suction configuration and the second suction configuration may be configured such that if the suction system was caused to operate in the first suction configuration at the second temperature, the rate of flow of fluid along the gutter would be greater than the rate of flow of fluid along the gutter when the suction system is caused to operate in the second suction configuration at the second temperature.

The method of operating a continuous inkjet printer may further comprise obtaining temperature data indicative of a temperature of ink flowing within the Venturi. The method of operating a continuous inkjet printer may further comprise controlling a rate of flow of fluid along the gutter line based on said temperature data.

The temperature data may be directly indicative of a temperature of ink flowing within the Venturi (e.g. from a temperature sensor provided within, or close to, the Venturi), or indirectly indicative of a temperature of ink flowing within the Venturi (e.g. from a temperature sensor provided elsewhere within the printer, or close to the printer). The temperature data may be received from an external source (e.g. a factory temperature reading).

The method of operating a continuous inkjet printer may further comprise obtaining relationship data indicating a relationship between the temperature data and a configuration of the gutter flow rate control system. The method of operating a continuous inkjet printer may further comprise determining a configuration of the gutter flow rate control system based on said temperature data and said relationship data. The method of operating a continuous inkjet printer may further comprise configuring the gutter flow rate control system to have the determined configuration.

The configuration of the gutter flow rate control system may comprise a controllable fluid path configuration.

The method of operating a continuous inkjet printer may further comprise obtaining data indicating a characteristic of the printer. The method of operating a continuous inkjet printer may further comprise determining (or selecting) a configuration of the gutter flow rate control system based on said data indicating a characteristic of the printer. The method of operating a continuous inkjet printer may further comprise configuring the gutter flow rate control system to have the determined configuration.

The determining, or selecting, may comprise selecting one of a plurality of suction configurations based upon the temperature. Such a selection may be made in order to reduce excess gutter flow rate. That is, the selection may be made so as to select a configuration which provides a sufficient, but not excessive, gutter flow rate.

The selection may be made so as to cause the gutter flow rate to fall within an acceptable gutter flow rate range during normal printing operations. That is, when a printer is under normal operating conditions (e.g. with a jet of ink being emitted by the droplet generator for printing, and a majority of the jet being received by the gutter), the gutter flow rate control system may be configured to control the suction system to maintain the gutter flow rate above a minimum acceptable level, and to reduce the excess gutter flow rate above that minimum level.

Said determining may be based on said data indicating a characteristic of the printer and said relationship data. Said relationship data may be obtained based on said configuration data. For example, appropriate relationship data may be obtained based on a configuration of the printer (e.g. printhead orientation or height, or umbilical length) or another characteristic (e.g. ink type and/or viscosity).

According to a further aspect of the present disclosure, there is provided a method of operating a continuous inkjet printer, the printer comprising an ink supply system, a droplet generator configured to receive ink from the ink supply system and to produce a jet of ink for printing, a gutter configured to receive parts of the jet that are not required for printing, a gutter line connected to the gutter and configured to return unprinted ink to the ink supply system, a suction system comprising a Venturi having a suction port configured to apply a suction force to the gutter line, and a gutter flow rate control system configured to control a rate of flow of fluid along the gutter line comprising a controllable fluid path configured to allow ink to flow to a location in fluid communication with a suction port of the Venturi. The method comprises determining a configuration of the controllable fluid path and configuring the controllable fluid path to have the determined configuration.

The method may further comprise configuring the controllable fluid path to cause the gutter flow rate to have a gutter flow rate within a target gutter flow rate range. The target gutter flow rate range may comprise a minimum gutter flow rate. The method may further comprise configuring the controllable fluid path to cause the gutter flow rate to not drop below the minimum gutter flow rate, and to minimise an excess gutter flow rate above the minimum gutter flow rate.

Said determining may comprise obtaining temperature data and determining said configuration of the controllable fluid path based upon said temperature data.

Said determining and/or said configuring may be performed by a controller of the printer (e.g. based upon temperature sensor data, or received temperature data) or by an operator of the printer.

According to a yet further aspect of the present disclosure, there is also provided a method of operating a continuous inkjet printer comprising an ink supply system; a droplet generator configured to receive ink from the ink supply system and to produce a jet of ink for printing; a gutter configured to receive parts of the jet that are not required for printing; a gutter line connected to the gutter and configured to return unprinted ink to the ink supply system; a suction system comprising a Venturi having a suction port configured to apply a suction force to the gutter line; and a gutter flow rate control system. The method comprises controlling the suction force generated by the suction system to control the rate of flow of fluid along the gutter line.

Said controlling the suction force generated by the suction system may comprise determining a target suction system configuration and configuring the suction system to have the determined configuration.

Said determining may comprise obtaining temperature data and determining said target controllable fluid path configuration based upon said temperature data.

Said determining and/or said configuring may be performed by a controller of the printer (e.g. based upon temperature sensor data, or received temperature data) or by an operator of the printer.

It will be appreciated that any of the features described above with reference to the various continuous inkjet printer aspects are intended to be combined with the methods described above.

According to a yet further aspect of the present disclosure, there is provided a method of modifying a continuous inkjet printer. The method comprises providing the continuous inkjet printer, the continuous inkjet printer comprising an ink supply system, a droplet generator configured to receive ink from the ink supply system and to produce a jet of ink for printing, a gutter configured to receive parts of the jet that are not required for printing, a gutter line connected to the gutter and configured to return unprinted ink to the ink supply system, and a suction system comprising a Venturi having a suction port configured to apply a suction force to the gutter line. The method further comprises installing a gutter flow rate control system in said printer. The gutter flow rate control system comprises a controllable fluid path having a plurality of fluid path configurations. Each configuration may cause the suction system to exert a different suction force on the gutter line.

Each configuration may cause the suction system to exert suction on the gutter line which is configured to cause a different gutter flow rate for a given temperature.

The gutter flow rate control system may be configured to control the rate of flow of fluid along the gutter line based on temperature.

The gutter flow rate control system may be configured to cause the suction system to operate in a first suction configuration (e.g. a high power configuration) at a first (e.g. high) temperature, and to operate in a second suction configuration (e.g. a reduced power configuration) at a second (e.g. low) temperature, the first temperature being higher than the second temperature.

The first suction configuration and the second suction configuration may be configured such that if the suction system was caused to operate in the first suction configuration at the second temperature, the rate of flow of fluid along the gutter would be greater than the rate of flow of fluid along the gutter when the suction system is caused to operate in the second suction configuration at the second temperature.

The gutter flow rate control system and/or controllable fluid path installed in a continuous inkjet printer may comprise one or more features described above in connection with any of the earlier aspects of the present disclosure. That is, by modifying the continuous inkjet printer in the way described, a continuous inkjet printer according to any of the first, second or third aspects (with or without various optional features thereof) may be provided.

Figure 2:
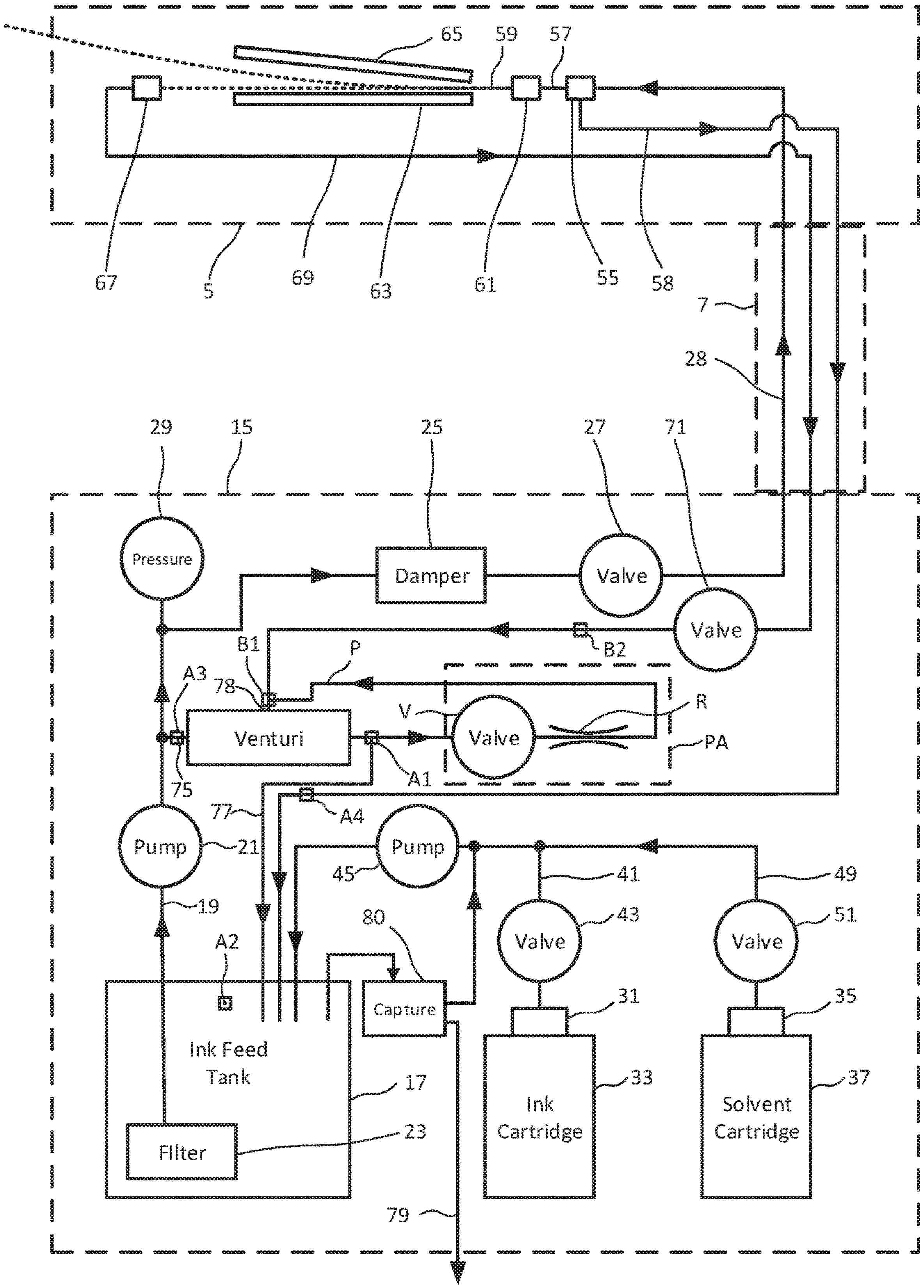
Figure 3:
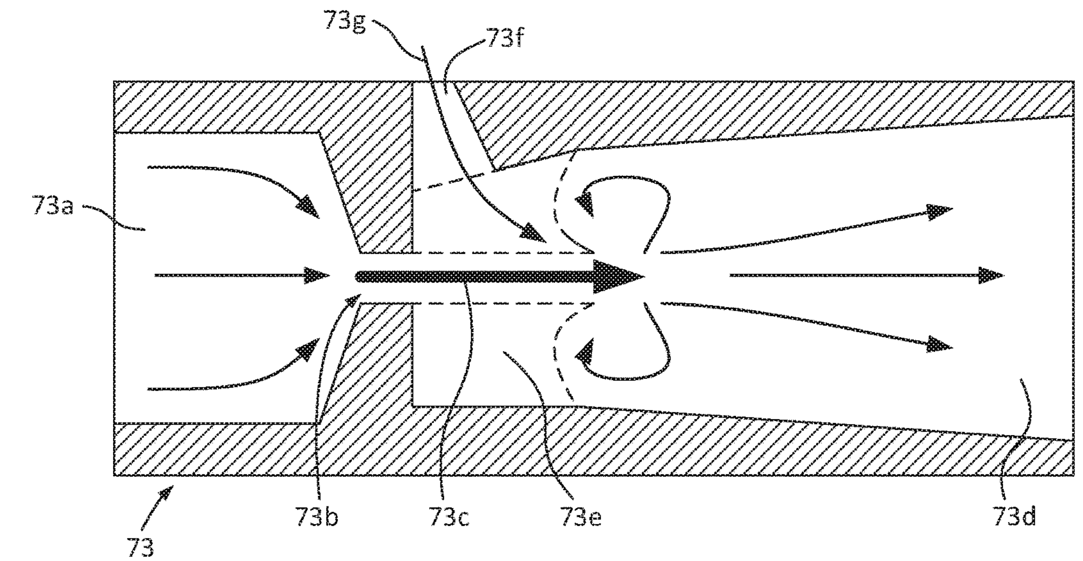
Figure 4:
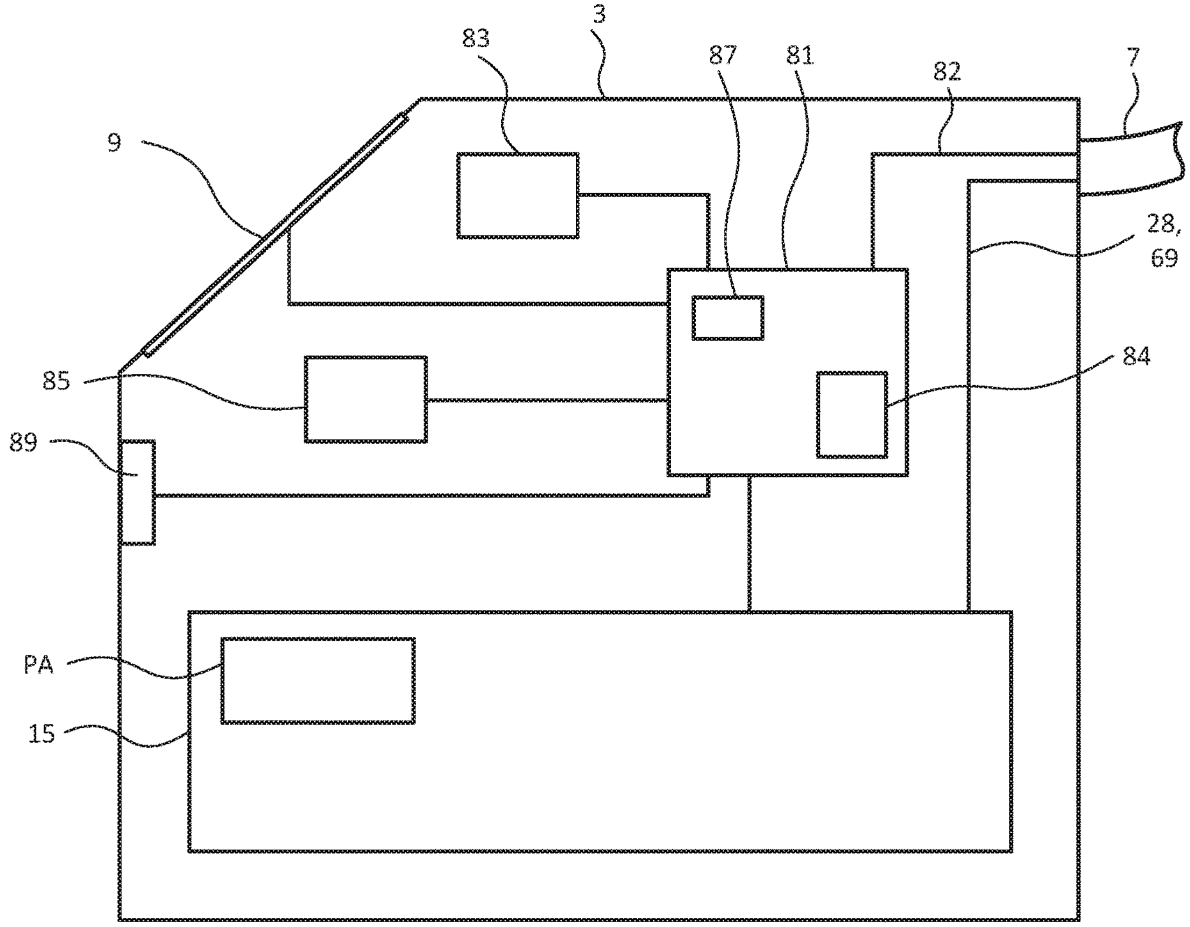
Figure 5:
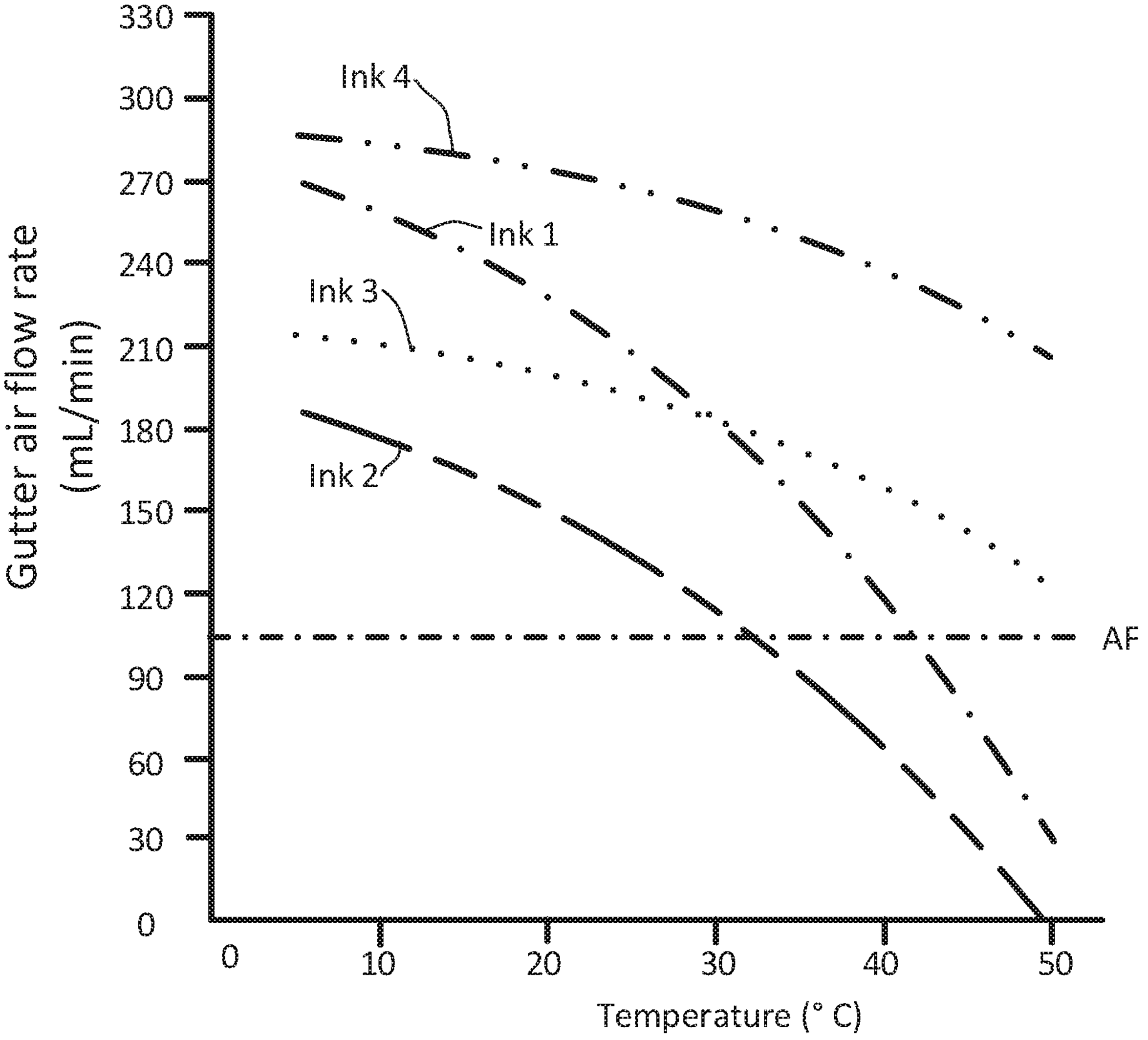
Figure 6:
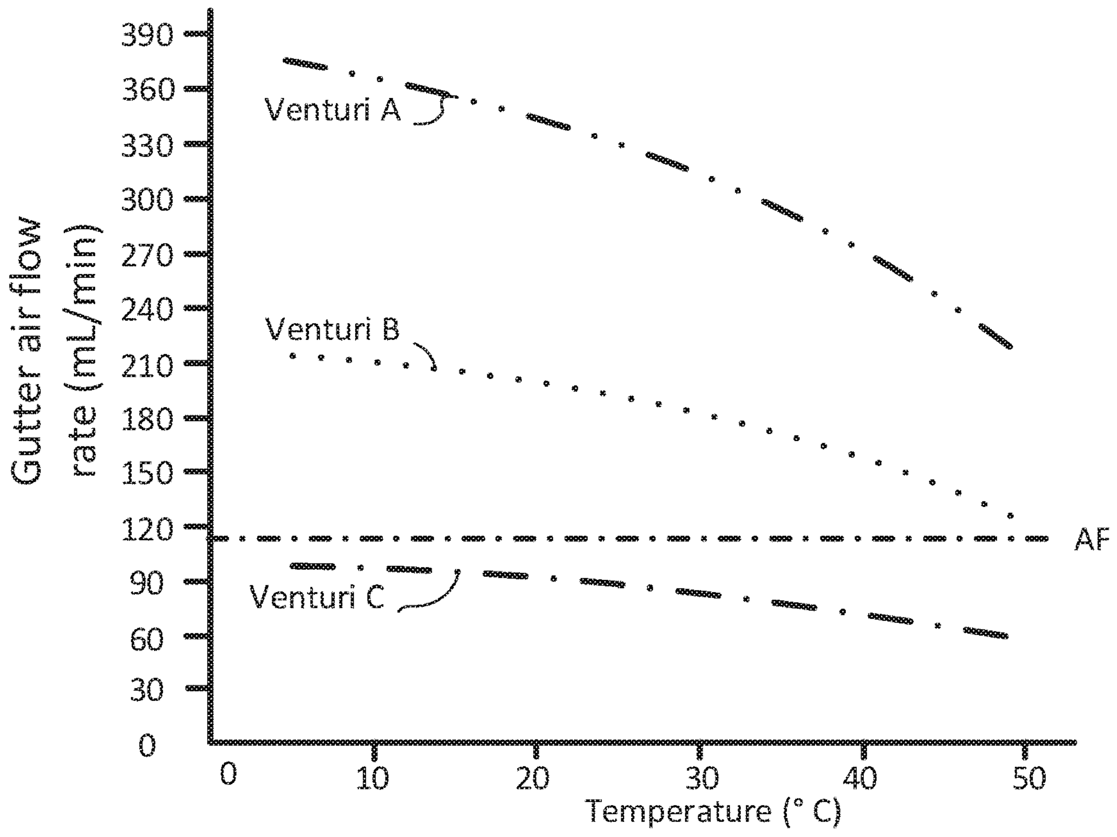
Figure 7:
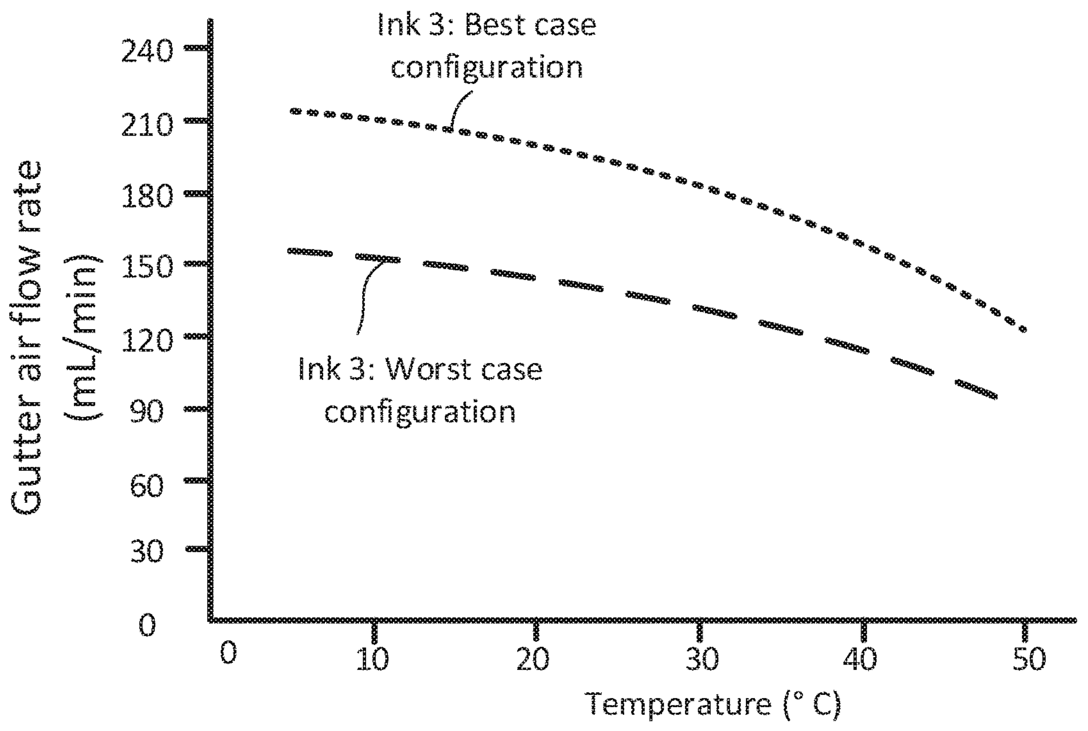
Figure 8:
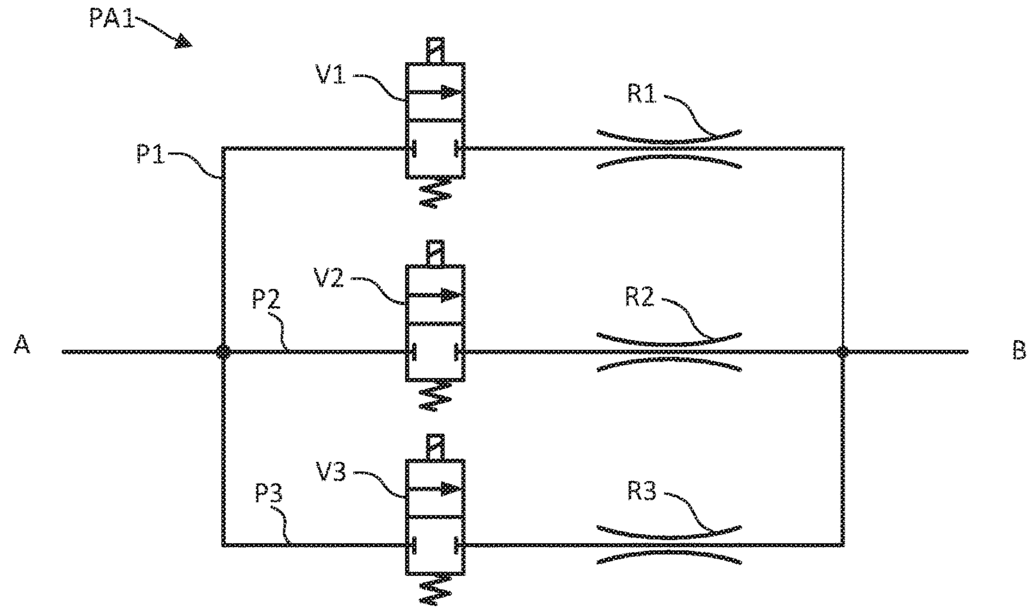
Figure 9:
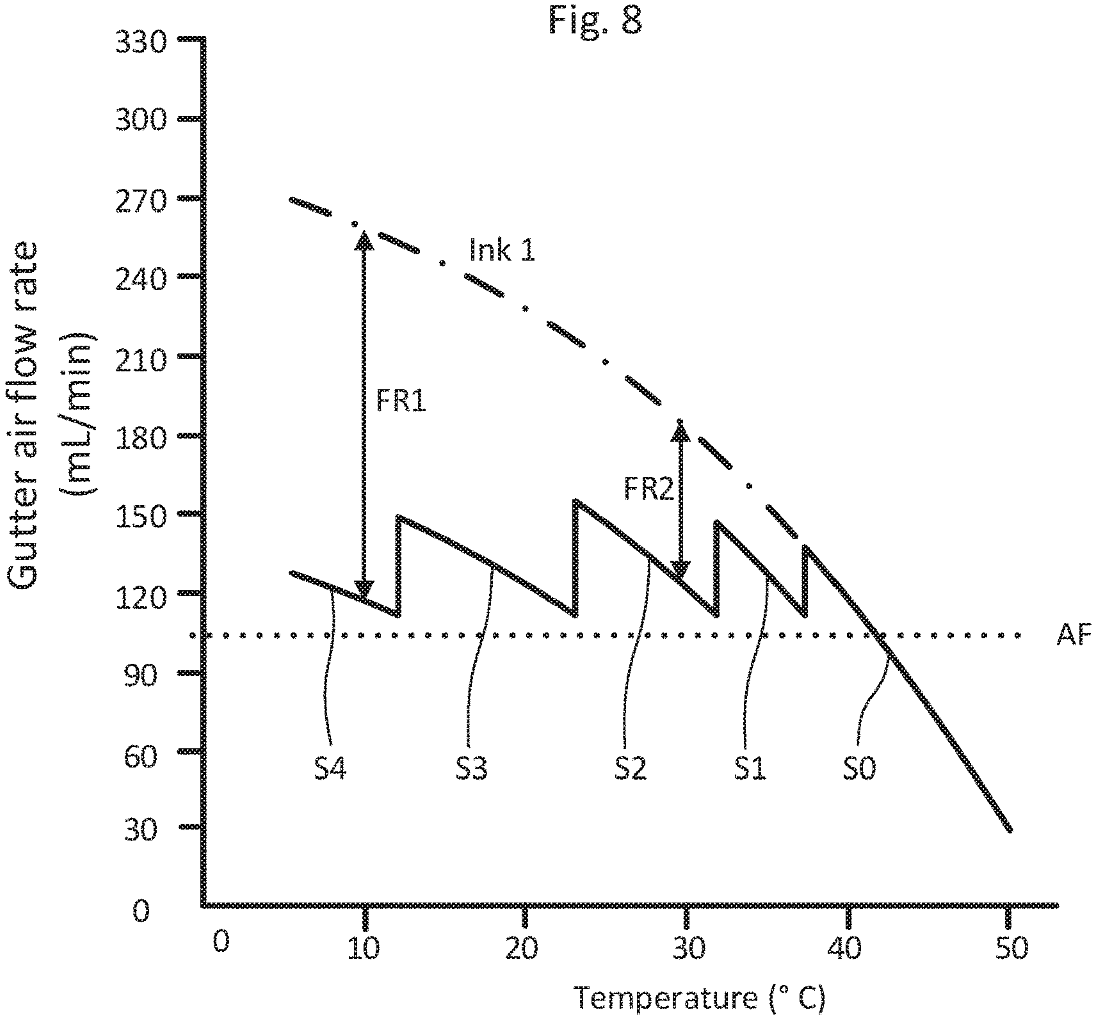
Figure 10:
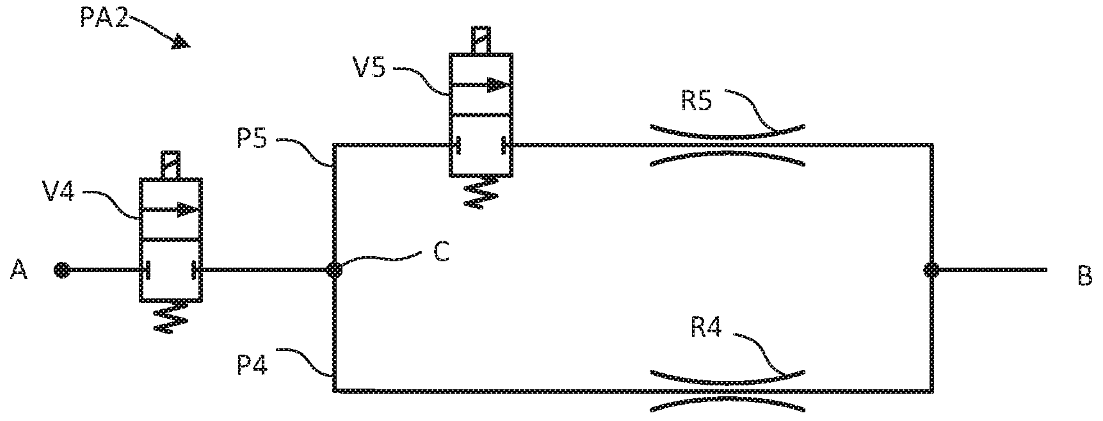
Figure 11:
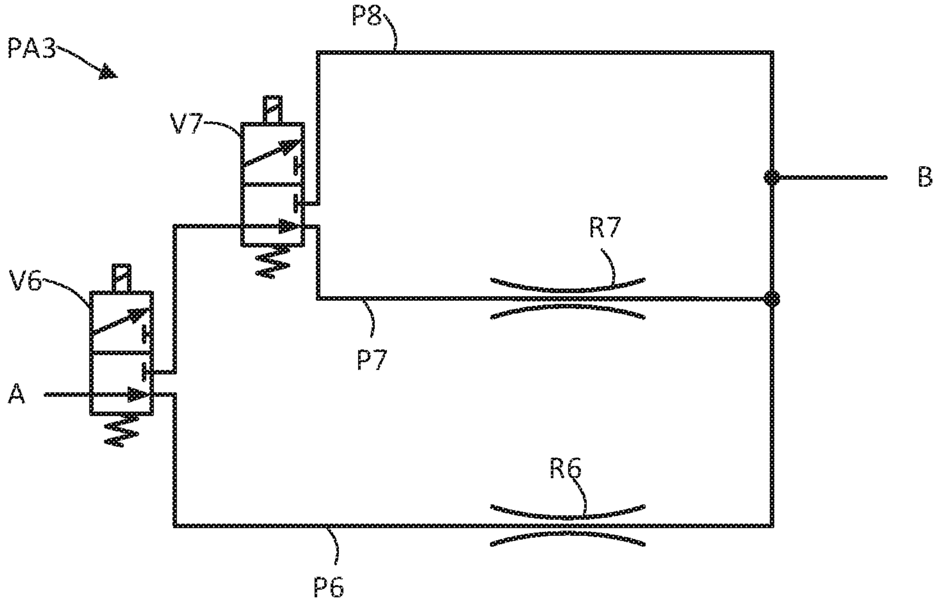
Figure 12:
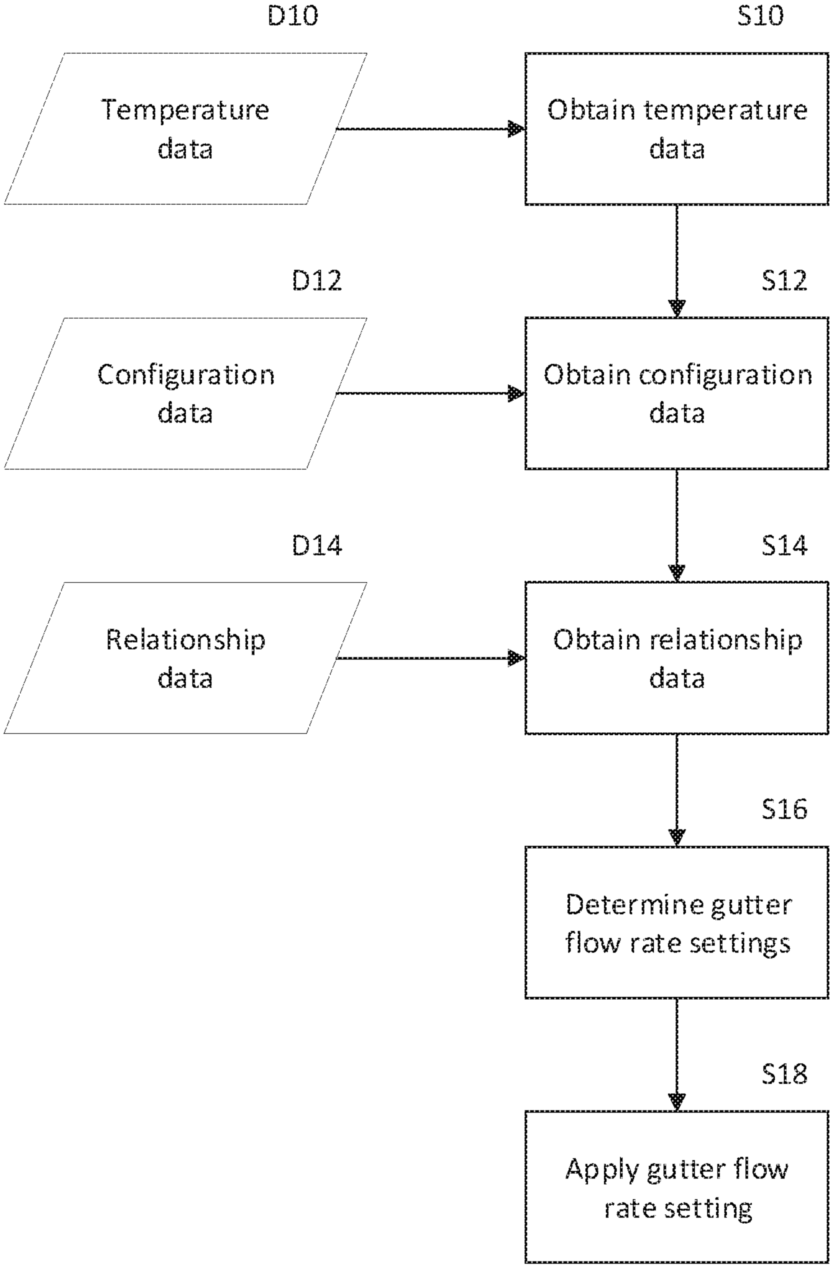
Figure 13:
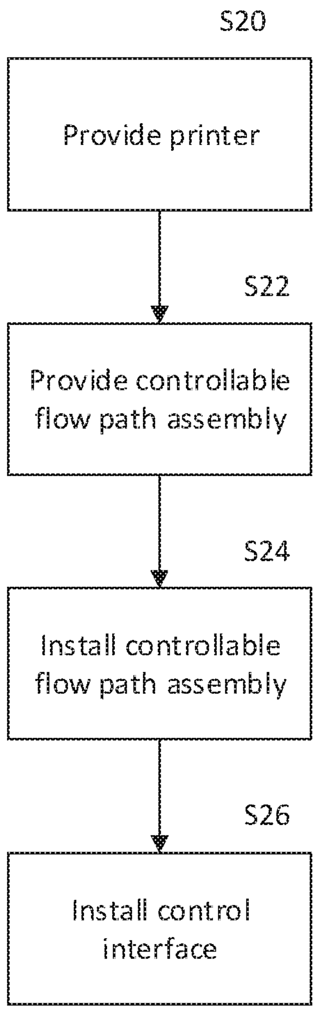

Embodiments of the invention will now be described, by way of example only, with reference to the accompanying drawings in which:

FIG. 1 schematically illustrates a continuous inkjet printer;

FIG. 2 schematically illustrates a fluid system of the continuous inkjet printer of FIG. 1;

FIG. 3 schematically illustrates a suction system of the continuous inkjet printer of FIG. 1;

FIG. 4 schematically illustrates a control system of the continuous inkjet printer of FIG. 1;

FIG. 5 schematically illustrates a characteristic of the suction system of the continuous inkjet printer of FIG. 1 with different ink types;

FIG. 6 schematically illustrates a characteristic of the suction system of the continuous inkjet printer of FIG. 1 with different Venturi configurations;

FIG. 7 schematically illustrates a characteristic of the suction system of the continuous inkjet printer of FIG. 1 with different printhead configurations;

FIG. 8 schematically illustrates part of a gutter flow rate control system for use in of the continuous inkjet printer of FIG. 1;

FIG. 9 schematically illustrates a characteristic of the gutter flow rate control system of FIG. 8;

FIG. 10 schematically illustrates part of an alternative gutter flow control system for use in the continuous inkjet printer of FIG. 1;

FIG. 11 schematically illustrates part of an alternative gutter flow control system for use in the continuous inkjet printer of FIG. 1;

FIG. 12 schematically illustrates a method of operating a gutter flow rate control system in the continuous inkjet printer of FIG. 1; and FIG. 13 schematically illustrates a method of installing a gutter flow rate control system in the continuous inkjet printer of FIG. 1.

In the figures, like parts are denoted by like reference numerals. It will be appreciated that the drawings are for illustration purposes only and may not be drawn to scale.

FIG. 1 schematically illustrates an ink jet printer 1. The printer 1 comprises a printer main body 3 connected to printhead 5 by an umbilical cable 7. The printer main body 3 may comprise the ink supply system and a printer controller, and the printer main body 3 may have a display 9 (e.g. a touchscreen) for use by an operator. The printhead 5 is arranged to print on a substrate, such as the surface of an item 11 moving along a production line 13.

Referring now to FIG. 2, a simplified schematic diagram of a fluid system for the ink jet printer of FIG. 1 is shown. The ink jet printer 1 comprises an ink supply system 15 which is contained within the main printer body 3. The ink supply system comprises an ink feed tank 17 (which may also be referred to as an ink supply tank) configured to supply ink along an ink pickup line 19. The ink is drawn from the feed tank 17 by a pump 21 with ink also passing through a filter 23 to remove any particles contained within the ink feed tank. A damper 25 is provided after the pump to reduce fluctuations in ink pressure within the ink supply. A valve 27 is provided after the damper 25. An ink supply line 28 is configured to carry ink from the ink supply system 15, along the umbilical 7, to the print head 5. The ink supply line 28 is connected to the ink pickup line 19 via the pump 21, damper 25 and valve 27. The ink supply line 28 and the ink pickup line 19 cooperate to transport ink from the ink feed tank 17 to the print head 5, and may collectively be referred to as the ink supply line 28. The valve 27 is configured to control the ink supply to the print head 5. A pressure sensor 29 is connected to the ink 19 and is configured to monitor the pressure at the outlet of the pump 21. The pump 21 may be operated as a constant pressure pump (i.e. the pump is controlled to maintain a constant output pressure).

The ink supply system 15 also includes an ink cartridge connection 31 which may be connected to an associated ink cartridge 33 and a solvent cartridge connection 35 which may be connected to an associated solvent cartridge 37. The ink cartridge 33 and ink cartridge connection 31 are connected to an ink refill line 41, allowing ink to be drawn through a valve 43 by a pump 45 (e.g. a transfer pump), and fed to the ink feed tank 17.

Similarly, the solvent cartridge 37 and the solvent cartridge connection 35 are connected to a solvent refill line 49, allowing solvent to be fed via a valve 51 to the ink feed tank 17 under the influence of the pump 45. Each of the valves 43, 51 can be operated independently allowing either ink or solvent to be supplied to the ink feed tank independently of one another under the control of the pump 45.

In some configurations, an ink reservoir and/or a solvent reservoir (not shown) may be provided to temporarily store ink or solvent between the cartridge 33, 37 and respective refill line 41, 49.

As described above, ink is fed along the ink pickup line 19 and ink supply line 28 to the print head 5 via the umbilical 7. Within the print head 5 the ink is provided to a droplet generator 55. The ink is provided to the droplet generator under pressure (under the influence of the pump 21) and is forced through a nozzle of the droplet generator 55 forming an ink jet 57. The ink jet 57 begins as a constant stream of ink and, under the influence of surface tension and vibrations applied in the droplet generator 55 (e.g. by a piezoelectric oscillator), gradually separates into a series of ink droplets 59 which continue to travel in the direction of the ink jet 57.

In some printers (such as that illustrated in FIG. 2) a purge line 58 is connected to the droplet generator. The purge line 58 may be connected to a purge port of the droplet generator 55. The droplet generator 55 may be provided as part of a droplet generator assembly, which includes a droplet generator body having known acoustic properties, and a piezoelectric oscillator. The purge port may be provided by the body, or by a separate part connected to the body. The purge line 58 allows ink to flow out of the droplet generator via a purge aperture without passing through the nozzle, and allows the droplet generator to be cleaned. The purge line 58 extends from the droplet generator 55, along the umbilical 7, and returns ink (or solvent), depending upon the phase of operation, to the ink feed tank 17. One or more valves (not shown) may be provided within the purge line 58. It will be understood that the purge line is not essential, and may be omitted in some printers.

Shortly after emerging from the nozzle of the droplet generator 55, the ink jet 57 is passed through a charge electrode 61. The point at which the continuous ink jet 57 separates into droplets 59 is arranged to occur within the charge electrode 61. The ink is an electronically conductive liquid, and the droplet generator is conventionally held at a fixed (e.g. ground) potential. A variable voltage is applied to the charge electrode 61 causing charge to be induced on the continuous stream of ink extending from the ink droplet generator 55 towards the charge electrode 61. As the continuous stream of ink (i.e. ink jet 57) separates into droplets 59, any charge induced on the ink within the droplet becomes trapped at the moment the individual droplet "snaps" off from the main stream of ink 57. In this way, a variable charge can be applied to each of the ink droplets within in the stream of ink droplets 59.

The stream of ink droplets 59 then continues to pass from the charge electrode 61 between deflection electrodes 63, 65. A first one of the deflection electrodes 63 is held at a first voltage, whereas the second one of the deflection electrodes 65 is held at second voltage, with a large potential difference (e.g. 8-10 kilovolts) established between the deflection electrodes 63, 65. In some systems, one electrode may be maintained at a ground potential while the other electrode is held at a high (positive or negative) voltage (with respect to ground). In other systems, one electrode is held at a negative voltage (with respect to ground) and the other electrode is held at a positive voltage (with respect to ground). The field established between the deflection electrodes 63, 65 causes any charged droplets (i.e. those that have been charged by the charge electrode 61) to be deflected. In this way, based upon the variable charge applied by electrode 61, the droplets 59 can be selectively (and variably) steered from the path along which they are emitted from the nozzle of the droplet generator 55.

Droplets which pass through the deflection field without being deflected travel to a gutter 67. The gutter 67 comprises an orifice into which the droplets enter. The gutter 67 is connected to a gutter line 69 which extends from the gutter back to the ink system 15. A valve 71 is optionally provided within the gutter line 69 enabling the line to be opened and closed. A suction force is applied to the gutter line 69 by a suction system so as to draw ink along the line from the gutter back towards the ink system 15.

The suction force is provided in many inkjet printers by the suction system which comprises a Venturi 73 (which may also be referred to as a jet pump). The Venturi 73 is provided within the ink system 15 and is configured to receive a pressurised flow of ink from the ink pump 21 from a Venturi supply line 75 which branches from the ink supply line 28 after the pump 21 (but before damper 25). The ink flowing through the Venturi 73 from the Venturi supply line 75 returns to the ink feed tank 17 via an ink return line 77 after it has passed through the Venturi 73. The Venturi supply line 75 could be controlled (e.g. restricted, or selectively blocked) by a valve (not shown), which could be placed at point A3.

The ink pump may be operated as a pressure controlled pump, meaning that the ink flow rate through the pump will be adapted as necessary to maintain a target pressure at the pump outlet (e.g. as monitored by pressure sensor 29). The ink pump 21 may be configured to supply ink to the printhead at a predetermined system operating pressure, which may be determined based upon the printer configuration (e.g. nozzle geometry). For example, a nozzle having a diameter of 75 μm may require a lower operating pressure than a nozzle having a diameter of 62 μm to achieve a similar jetting performance (e.g. ink droplet breakup location, or flight time to breakup). The system operating pressure may also be varied in dependence upon other system parameters (e.g. ink type, viscosity).

As shown schematically in FIG. 3, the Venturi 73 comprises an inlet 73*a*, through which ink flows from the Venturi supply line 75. From the inlet 73*a* ink flows through a flow restriction 73*b*. The flow restriction 73*b* comprises an aperture through which the ink flows, forming a Venturi ink jet 73*c*. The inlet 73*a* may have a bore diameter of around 4 mm, with the flow restriction 73*b* having a bore diameter of around 0.7 mm, and a length of around 1 to 15 mm.

The ink velocity within the ink jet 73*c* is increased as compared to the ink velocity within the inlet region 73*a*. The ink velocity slows again in the outlet region 73*d*, which may have a bore diameter of around 4 mm. The outlet region 73*d* is connected to the ink return line 77. The ink flow from the Venturi supply line 75 via the inlet 73*a*, the flow restriction 73*b*, the outlet region 73*d*, and the ink return line 77 may be referred to as a primary ink flow path.

Due to Bernoulli's principle, the pressure within the high velocity ink jet 73*c* is reduced with respect to the pressure within the inlet 73*a*. As a result of this low pressure, a low pressure region 73*e* is formed around the ink jet 73*c*. The low pressure region 73*e* has a negative gauge pressure.

An opening 73*f* is provided within the housing of the Venturi 73 downstream of the flow restriction 73*b*. The opening 73*f* passes from a suction port 78 provided on the body of the Venturi 73 to the low pressure region 73*e*.

In use, the gutter line 69 is connected, via the suction port 78 and the opening 73*f* to the low pressure region 73*e*. In this way, the low pressure region 73*e* created within the Venturi 73 is used to apply a suction force to the gutter line 69. The suction force has a predetermined relationship with the rate of ink flow along the primary ink flow path (for a given design of Venturi).

Any ink flowing into gutter 67 will be caused to flow along the gutter line 69, and will eventually be sucked into the Venturi 73 (via suction port 78) and will exit the Venturi via the outlet 73*d* and will pass along the return line 77 before returning to the ink feed tank 17.

By using a Venturi in this way (i.e. as a jet pump), a system can be designed in which the main system ink pump 21 can generate both positive pressures (e.g. to supply ink to the print head) and negative vacuum pressure (e.g. to provide gutter suction).

It will be understood that the terms "negative vacuum pressure" and "negative pressure" are intended to refer to pressure which is lower than atmospheric pressure, with a negative differential pressure or gauge pressure being established between the region concerned and the ambient environment (which is at atmospheric pressure).

It will be understood that the design and configuration of the Venturi will depend upon many system parameters, and is not required to confirm precisely to the configuration and dimensions described above.

In addition to unprinted droplets of ink being recirculated via the gutter 67, any air which is sucked into the gutter 67 will also be delivered to the Venturi 73 where it will become entrained with the ink flow and will then pass to the ink feed tank 17. The ink feed tank 17 is vented by a vent 79, preventing excess pressure building up within the ink tank 17. It will be understood, however, that venting air via the vent 79 may cause solvent vapour to be vented to the external environment, which may be undesirable (e.g. since the solvent will need to be replaced, and may be damaging to the environment).

In some embodiments, a capture tank 80 may be connected to the vent 79 to capture solvent from the vented air. The capture tank 80 may comprise a condenser. Captured solvent may be returned to another location within the ink supply system 15, such as, for example, the ink feed tank 17, and may be connected to the pump 45.

As described above, the valve 27 is configured to prevent the ink supply line 28 from being continuously open. However, since the valve 27 is provided downstream of the branch with Venturi supply line 75, even when the valve 27 is closed, when the pump 21 is operating, a flow of ink will flow along Venturi supply line 75 through the Venturi 73, resulting in suction being applied to the gutter line 69. In this way, the gutter line 69 suction can be applied even when ink is not being supplied to the ink print head 5. Of course, valve 57 may also be operated to block the gutter line, meaning that the gutter suction can be controlled independently of the Venturi 73.

While it is described above that a pump 45 is operated to transfer ink or solvent from the ink and solvent 33, 37, in alternative arrangements the Venturi 73 described above can be operated for this purpose, with an additional suction port (or branch in gutter line 69) being provided to draw fluid from the respective cartridge and deliver it to the ink feed tank 17. Alternatively, the pump 45 may be implemented as an additional Venturi which operates entirely separately from the Venturi 73.

In addition to the fluid lines from the ink system to the print head, which include the ink supply line 28, purge line 58, and the gutter return line 69, there may be additional fluid connections housed within the umbilical 7 connecting the ink supply system 15 to the print head 5. For example, an air recirculation line may be provided to provide solvent saturated air to the gutter return line 69 close to the gutter entrance, for example as described in GB 2,447,919.

FIG. 4 shows schematically a control system for the printer 1. The main body 3 contains the ink supply system 15 described above with reference to FIG. 2. The main body 3 also houses a controller 81 which is configured to provide control signals to control the various actuators (e.g. valves and pumps) of the ink supply system 15. The controller 81 is also configured to control the electrical components of the print head, such as the droplet generator 55, charge electrode 61, and the deflection electrodes 63, 65. Control signals for the electrical components of the print head are carried by electrical wires 82 (which may comprise a plurality of wires carrying different types of electrical signal and or supply). The electrical wires 82 pass along the umbilical 7 from the controller 81 to the print head 5.

The controller 81 may also be configured to receive one or more feedback signals from the print head 5. In particular, the controller may receive sensor signals from various sensors contained within the print head 5. Such sensors may include one or more phasing sensors, which are configured to monitor the phase of ink droplets as they pass along the print head from the droplet generator 55, allowing the phasing of signals applied to the charge electrode 61 to be accurately controlled. Further sensors may also be included, such as, for example, one or more of: an ink build up sensor (configured to detect build-up of ink on printer surfaces, for example around the gutter 67), a temperature sensor (e.g. to indicate ink temperature), a current or voltage sensor (e.g. to detect electrical short circuits), and a viscometer (to sense ink viscosity).

The controller 81 is also configured to receive inputs from and to display information to the interface 9 as required. Of course, the controller may also be configured to interact with different I/O devices and may be additionally connected to a network via a network interface device 83 (e.g. a modem), allowing remote access to and/or control of the printer 1. A network interface also allows data to be provided from the controller 81 to external monitoring systems.

The controller may further comprise a gutter flow rate controller 84, which is described in more detail below.

It will be appreciated that the controller 81 may take any appropriate form. In particular, the controller 81 may comprise one or more processing components such as a microprocessor and other associated components such as memories and/or interface blocks. Moreover, different control functions of the printer 1 may be performed by different sub-controllers which may be provided on a single control board, or may be provided in different locations within the printer 1. The controller 81 may thus comprise a plurality of separate sub-controllers or processors. The controller 81 may also be configured to control and/or generate high voltage signals for the deflection electrodes via a voltage convertor provided within the printer housing 3 or the printhead 5. Such components are not described in detail herein, since they are common components of an industrial ink jet printer.

One or more temperature sensors 85 may also be provided within the printer 1, and may be configured to provide as an output a temperature signal which is passed to the controller 81. The controller may be configured to receive the temperature signal and generate temperature data on the basis of the temperature signal. The temperature data may be data indicative of the temperature of a particular component of the printer 1. For example, the temperature data may be indicative of a temperature of a component housed on a control board of the controller 81, or alternatively of a temperature of fluid flowing within the Venturi 73. Alternatively, or in addition, one or more further temperature sensors may be provided. A temperature sensor may generate data indicative of an ambient temperature. Alternatively, data indicative of an ambient temperature may be received by the controller 81 from an external source (e.g. a factory control system).

As described above, in normal operation, a continuous stream of ink droplets 59 is emitted from the nozzle of the droplet generator 55. Typically, only a small proportion of ink droplets are used for printing, meaning that a (potentially very significant) majority of emitted droplets are captured by the gutter 67. As also described above, the suction applied to the gutter line 69 by Venturi 73 results in fresh air being drawn into the gutter 67 from the region around the printhead 5. In order to avoid significant build-up of pressure within the ink system 15, excess air is vented via the vent 79.

It has been realised that the rate of air drawn into the gutter due to the suction force generated by the Venturi 73 is heavily dependent upon temperature. More particularly, it is understood that the rate of air drawn into the gutter reduces as temperature increases, as a result of the relationship between the vapour pressure of solvent in the low pressure region **73*e*** and temperature. The rate of fluid flow along the gutter is also a function of the type of ink. More particularly, the type of solvent upon which the ink is based has a significant impact on the rate of fluid flowing along the gutter.

When configuring an inkjet printer of the sort described above, the Venturi 73 will typically be designed in such a way that for all recommended operating temperatures for a given ink type, the rate of fluid flow along the gutter line 69 is sufficient to avoid ink overflowing from the gutter opening 67.

Further, a printer is typically designed in order to operate reliably in substantially all configurations. That is, the printer will be designed so that with an approved ink and within an approved temperature range, sufficient fluid is drawn into the gutter line 69 so as to ensure that in all but exceptional circumstances (e.g. where a malfunction—such as a blockage—has occurred), substantially all of the ink reaching the gutter 67 is drawn away by the gutter line 69.

FIG. 5 illustrates schematically the volume of air drawn into the gutter per unit time (y-axis; mL/min) plotted against ambient temperature (x-axis; degrees Celsius) for a variety of different inks (Ink 1; Ink 2; Ink 3; Ink 4) when operating with a particular Venturi geometry and printhead arrangement. In each case, the rate of air flow drops significantly as the temperature increases, although the rate of change and the start and end points are different.

It will further be appreciated that if the rate of fluid flow along the gutter line 69 reduces below a critical threshold, ink entering the gutter 67 may not be removed. In such circumstances ink will no longer be drawn away from the gutter 67 and may instead overflow from the gutter resulting in ink being deposited around the gutter and potentially leaking from the print head 5.

An air-flow threshold AF is shown represented by a horizontal line in the graph of FIG. 5. This indicates the rate of air-flow required to ensure that substantially all ink is removed from the gutter regardless of printhead orientation, umbilical length and printhead height. AF may therefore represent a design target gutter air flow rate, which would still be sufficient to work for most inks at most temperatures.

It can be seen that for the illustrated Venturi geometry with an ink operating temperature of above around 32° C., it cannot be guaranteed that when ink 2 is used all ink will be reliably captured by the gutter. As such, ink 2 may not be recommended for use above this temperature. Ink 2 has an acetone base. On the other hand, ink 3 has a characteristic that allows reliable gutter operation at all temperatures up to 50° C. (with the same Venturi geometry and printhead configuration). Ink 3 has an MEK base. Ink 1 appears to allow reliable gutter operation below around 42° C., and has an ethanol/acetone base. Ink 4 appears to allow reliable gutter operation at all temperatures, and has a DEK/ethanol base.

FIG. 6 illustrates schematically the volume of air drawn into the gutter per unit time (y-axis; mL/min) plotted against temperature (x-axis; degrees Celsius) for a given ink (ink 3, from FIG. 5) when operating with a variety of different Venturi geometries (Venturi A; Venturi B—as shown in FIG. 5; Venturi C). In each case, the rate of air flow drops significantly as the temperature increases, although the rate of change and the start and end points are different. The air-flow threshold AF is again shown. It will be appreciated that the design of a Venturi will vary from one system to another, and that in some circumstances a particular Venturi may never provide enough suction to reliably remove ink from the gutter (e.g. Venturi C), whereas another Venturi (e.g. Venturi A) may provide excess suction at all temperatures.

FIG. 7 illustrates schematically the volume of air drawn into the gutter per unit time (y-axis; mL/min) plotted against temperature (x-axis; degrees Celsius) for a given ink (ink 3, from FIG. 5) when operating with a particular Venturi geometry but with different printhead configurations. In each case, the rate of air flow drops significantly as the temperature increases, although the rate of change and the start and end points are different. In a best case configuration, with a short umbilical (e.g. 2 m) and an optimally oriented printhead positioned level with the printer cabinet, the air-flow ranges from around 215 mL/min at 5° C. to around 125 mL/min at 50° C. On the other hand, in a worst case configuration, with a long umbilical (e.g. 6 m) and a sub-optimally oriented printhead positioned at a level below the printer cabinet, the air-flow ranges from around 160 mL/min at 5° C. to around 90 mL/min at 50° C. In addition to this range in air-flow, tolerances between different printers may contribute to a further variation in performance (e.g. a reduction in performance at all temperatures). It will be appreciated, therefore, that the gutter air-flow rate for a given ink and Venturi design will vary when the printhead configuration is changed. As such, a system will typically be designed to accommodate a worst (reasonable) case configuration.

Generally speaking, it will be appreciated that further different ink compositions and solvent bases, Venturi designs and printhead configurations will result in different temperature characteristics. However in each case, such a characteristic will exist, and can be established by monitoring air flow rate along the gutter at different temperatures (e.g. by providing a flow meter in the gutter line, or by connecting the printer to a test assembly with suitable sensors). Alternatively, modelling may be used to predict air flow based on the vapour pressure of a solvent at different temperatures. The rate of airflow is understood to vary as a function of the vapour pressure of the solvent (which itself is a function of temperature). Modelling can therefore be performed on this basis, also taking into account system design parameters (e.g. ink flow rate, Venturi design, etc.). Thus, for each configuration, a characteristic (e.g. a characteristic of the printer) will exist. Data indicative of the characteristic may be stored in the printer for subsequent use.

As described above, when configuring an inkjet printer, the Venturi 73 will typically be designed in such a way that for all recommended combinations of operating configurations, temperatures and ink types, the rate of fluid flow along the gutter line 69 is sufficient to avoid ink overflowing from the gutter opening 67.

It has, however, been realised that by designing an ink recovery system for the worst case scenario, in most operating circumstances the suction provided by the gutter line 67 is far in excess of that required. For example, for a printer which is configured to operate with a particular ink across the temperature range from 10° C. to 40° C., but which usually operates at around 18° C., for much of operating time the rate of suction applied to the gutter will be far in excess of that required to clear the ink from the gutter opening 67. Should the temperature of the operating environment rise to closer to the 40° C. operating threshold, then the rate of suction will be reduced such that it becomes closer to the rate AF required to clear the ink flowing into the gutter 67. However, such circumstances will only rarely occur in reality, and may never occur during the operational lifetime of many printers. Moreover, when certain inks are used (e.g. ink 4 shown in FIG. 5) excess airflow will be likely at all temperatures.

In order to address this apparent over performance of the suction system, it has been realised that it is possible to reduce the rate of flow of fluid along the gutter line in most operating circumstances without negatively affecting the performance of the printer. In fact, if the level of suction applied to the gutter line 69 is reduced, the rate of air flowing into the gutter line will also be reduced, thereby reducing the rate at which solvent is vented from the system via the vent 79. That is, by apparently reducing the system performance, the rate of solvent loss can be significantly reduced, thereby providing a potentially significant improvement to the overall system performance in terms of solvent loss, and therefore in terms of running costs and environmental impact.

As described above, it has been discovered that there is a significant dependence of the operating characteristics of the Venturi with temperature (i.e. a relationship between the gutter flow rate and temperature). This dependence (which can be determined by measurement or modelling) can be used to provide a mechanism for determining when the (over) performance of the Venturi 73 can be reduced.

The present disclosure provides a gutter flow rate control system which is configured to control or regulate a rate of flow of fluid along the gutter line, for example, based on temperature.

For example, the temperature sensor 85 may be configured to generate data indicative of the temperature of the ink within the Venturi 73. The temperature data can then be used to determine an amount by which the rate of flow can safely be reduced.

Alternatively, a temperature sensor provided with the main printer body 3 may be used to generate a temperature signal which can in turn be converted into temperature data indicative of a temperature of the ink flowing through the Venturi 73. It will be understood that the temperature of the ink flowing through the Venturi 73 may be somewhat different than the temperature within the housing 3. However, it may be possible to determine a relationship between the temperature at different positions within the housing 3 (e.g. by using an offset, or calibration). As such, the temperature determined by a sensor within the housing may be used to provide data indicative of the temperature of the ink within the Venturi 73. Alternative temperature sensors could also be provided. For example, temperature sensors could be provided within the print head 5 providing an indication of the temperature of the ink as it is jetted from the nozzle or within the droplet generator 55. Alternatively, a temperature sensor could be provided within the ink feed tank 17, at the ink pump 21, or at any other convenient location within or around the ink supply system 15. In some embodiments, a temperature sensor can be provided within the Venturi itself.

In order to reduce gutter flow rate, a number of adaptations can be made to the fluid system in order to change the performance of the suction system.

For example, in an embodiment a controllable fluid path P may be provided which is configured to allow fluid to flow to the suction port 78 of the Venturi 73. The effect of introducing additional fluid (e.g. ink) to the suction port of the Venturi 73 is that the suction force experienced by the gutter line 69 upstream of the insertion point is reduced, thereby reducing the gutter flow rate. The controllable fluid path P comprises a valve V and a restrictor R, which together form a controllable fluid path assembly PA. The controllable fluid path assembly PA, when provided within an ink supply system, may be referred to as a gutter flow rate control system.

In the configuration shown in FIG. 2, the controllable fluid path P comprises a first controllable fluid path $P_{A1\text{-}B1}$ which is provided from a point A1 in the ink return line 77 allowing fluid to pass from the Venturi 73 to the ink feed tank 17. The controllable fluid path $P_{A1\text{-}B1}$ is provided from the point A1 to a point B1 within the gutter return line 69 close to the suction port 78. It will be appreciated that the fluid at point A1 will have a pressure which is slightly above ambient pressure. Moreover, since this fluid is already a mixture of ink and air, it will not present problems with introducing more air into the ink feed tank. The way in which the controllable fluid path $P_{A1\text{-}B1}$ is controlled will be discussed in more detail below.

In an alternative embodiment, a controllable fluid path $P_{A2\text{-}B1}$ may be provided from a point A2, which is provided within the ink feed tank 17, to the point B1 described above. That is, ink may be allowed to travel from the ink feed tank 17, where there is typically a slightly positive gauge pressure (due to the constant in-flow of air from the gutter), to close to the suction port 78 of the Venturi 73. Such an arrangement may be preferred where there is no convenient way to access the Venturi outlet (e.g. where the Venturi discharges directly into the ink feed tank 17). The location A may be adjusted to be another location within the ink supply system that is substantially at atmospheric pressure.

In a further alternative embodiment, a controllable ink path $P_{A3\text{-}B1}$ may be provided from a point A3 within the Venturi supply line 75, which has a positive pressure (with respect to atmospheric pressure). The ink path $P_{A3\text{-}B1}$ may be configured to allow ink to flow from the point A3 to the point B1 described above. It will be understood that other points within the positive pressure ink supply line (i.e. those points downstream of pump 21) may be selected, and may be largely equivalent to point A3.

In a further alternative embodiment, a controllable ink path $P_{A4-B1}$ may be provided from a point A4 within the purge line 58, which carries a flow of ink from the printhead 5 back to the ink feed tank 17 and which generally has a slightly positive pressure (with respect to atmospheric pressure). The ink path $P_{A4-B1}$ may be configured to allow ink to flow from the point A4 to the point B1 described above.

In any of the above described arrangements additional fluid, which in each case described above comprises ink, may be allowed to flow along the respective controllable fluid path P to a point close to the suction port 78. This additional fluid will have the effect of reducing the performance of the Venturi 73. That is, the suction force applied to the gutter line 69 upstream of the additional fluid entry point B will be reduced when additional fluid is allowed to flow.

Given typical operating conditions, the pump 21 may be configured to pump around 400 mL/min of ink. Of this, around 4 mL/min is typically supplied to the printhead to be jetted from the droplet generator 55, with the remainder of the ink flow passing through the Venturi 73. Typically, only a small fraction of the jetted fluid is used for printing, with most being is recirculated.

The controllable fluid path P may, for example, be controlled to allow between 0 and around 40 mL/min of ink to flow to the point B1. Such a flow rate is small in comparison to the rate of ink circulating through the Venturi 73. However, the impact of this change can reduce the volume of air drawn into the gutter at low temperatures by around a factor of two, while still ensuring reliable ink clearing of the gutter.

By making the additional fluid path P controllable in this way, it is possible to turn on and off (or to modulate) the effect of the additional fluid flow, and therefore to turn on and off the associated suction performance reduction. Moreover, by making the controllable fluid path P variable, it is possible to control the extent to which the performance of the Venturi 73 is reduced. For example, by applying a variable flow restriction to the fluid path P, by creating a plurality of discrete fluid restrictions, or by varying the time for which the fluid path is in particular configuration (e.g. by applying PWM), it is possible to control the amount of fluid flowing along the controllable fluid path P.

In order to provide a controllable fluid path P between points A and B, various fluid control arrangements can be used. For example, one or more valves may be configured to control one or more flow paths. In the arrangement shown in FIG. 2, a single valve V and flow restriction R are provided. However, more complex arrangements may be provided, as described in more detail below.

For example, a plurality of parallel flow paths may be arranged, each including a different restriction level. In this way, different levels of fluid restriction can be combined in parallel thereby providing a different overall restriction between the points A and B. Flow along the plurality of parallel flow paths may be controlled by valves such as two port valves that allow a fluid pathway to be selectively provided or blocked between an input and an output. Such valve may be referred to as “2/2” valves.

An alternative first controllable fluid path assembly PA1 is shown in FIG. 8. The first controllable fluid path assembly PA1 comprises three parallel flow path portions (or sub-paths) P1, P2, P3, which branch from a common point A. It will be understood that the common point A could be connected to any one of points A1, A2, A3, A4 in FIG. 2. The path portions P1, P2, P3 are then recombined before the point B. Each of the path portions P1, P2, P3 comprises a respective valve V1, V2, V3 and a respective restriction R1, R2, R3. The three flow paths portions P1, P2, P3 can each be switched on or off by the two port valves V1, V2, V3 allowing the fixed, but potentially different, restrictions R1, R2, R3 to be controllably connected in parallel with one another. In this way, the overall restriction level between points A and B can be controlled by appropriate control of the status of the three valves V1, V2, V3, providing eight different combinations of restriction. Appropriate choice of the flow restrictions R1, R2, R3 allows a variety of different overall flow restrictions to be introduced, with the spacing between different combinations of overall flow restriction being configurable. The eight different combinations of restriction can provide up to eight different levels of overall flow restriction.

The restrictions provided by each of the restrictors R1, R2, R3 may be controlled by introducing a portion of pipe having a narrow (and controlled diameter) circular bore, and/or by controlling the length of the bore. For example, the flow restrictors R1, R2, R3 could each have a length of around 15 mm, with a bore diameter of 0.75 mm, 0.65 mm and 0.54 mm, respectively. The flow restrictors may also comprise a controlled contraction and/or expansion between the nominal bore segment and connected pipes (which may, for example, have a bore diameter of around 2-4 mm). Of course, other suitable restriction geometries and configurations can be selected for each system in accordance with system requirements.

Table 1 shows the correspondence between the status of the valves V1, V2, V3 and an overall restriction level RL exhibited by the first controllable fluid path assembly PA1 of FIG. 8. Parallel combinations of restrictions are shown using “&” notation.

TABLE 1

| Valve configuration states | | | | |
|---|---|---|---|---|
| State | V1 | V2 | V3 | RL |
| S0 | Closed | Closed | Closed | Closed |
| S1 | Closed | Closed | Open | R3 |
| S2 | Closed | Open | Closed | R2 |
| S3 | Closed | Open | Open | R2 & R3 |
| S4 | Open | Closed | Closed | R1 |
| S5 | Open | Closed | Open | R1 & R3 |
| S6 | Open | Open | Closed | R1 & R2 |
| S7 | Open | Open | Open | R1 & R2 & R3 |

It can be seen that there are eight distinct states S0-S7, ranging from a complete block (i.e. S0) to S7 in which restrictions R1, R2 and R3 are allowed to flow in parallel with one another, thereby providing the highest possible flow rate through the controllable fluid path P. The use of three valves in this arrangement provides a relatively simple yet highly flexible system by which additional fluid flow can be controlled.

If the restrictions provided by any two of the restrictions R1, R2, R3 are the same, then different ones of the states S0 to S7 may be similar, or even identical, to one another. In some cases, component tolerances may result in measurable differences in restriction level. As such, nominally identical paths may present different restriction levels, and calibration may be used to grade or order different restriction levels. It will further be understood that the combination of flow paths will not necessarily be linear, and will depend upon the pressure at various points within the ink system, the geometry of the restrictions, and also on other characteristics, such as properties of the valves and the connection lines.

The valves V1, V2, V3 may be configured as normally closed solenoid valves, meaning that in the absence of an activation signal they remain closed, with the state S0 being selected. This also means that a valve failure or blockage will result in an operational system in which solvent consumption is no worse than printers without the gutter flow rate control system.

In some embodiments, the risk of valve failure can be reduced by periodic actuation of the valves. It will be appreciated that this technique can be applied regardless of the controllable fluid path configuration in use.

FIG. 9 shows schematically a modified air flow rate versus temperature characteristic when the gutter flow rate control system described above is in use. The characteristic is the same as ink 1 shown in FIG. 5. However, FIG. 9 also shows an adjusted characteristic that can be achieved using the gutter flow rate control system described herein. In particular, by switching between various different controllable fluid path states or configurations, different restriction levels can be introduced to the ink feedback path P, resulting in different gutter suction levels, thereby resulting in different reductions in gutter flow rate. In the illustrated example, states S0-S4 are used, with switching points provided at temperatures of about 12° C. (S4/S3), 24° C. (S3/S2), 32° C. (S2/S1), and 39° C. (S1/S0). It will be understood that the air flow rate is reduced from the original characteristic by a varying amount, in dependence upon the temperature.

It will be appreciated that gutter air flow rate (and associated solvent consumption) will not change where state S0 is used (i.e. between around 39° C. and 50° C. However, at all temperatures below this, air flow is reduced. This is understood to result in an associated reduction in solvent consumption. The extent of solvent use reduction may be dependent upon many factors, and does not necessarily (although can) vary in direct proportion to the reduction in airflow (not least since the solvent will evaporate at a lower rate at lower temperatures). Nevertheless, a significant reduction in solvent can be achieved. At a typical operating temperature of 20° C., a solvent usage reduction of around 50% may be achieved in many situations.

In the illustrated example, referring again to FIG. 9, when using ink 1 at an operating temperature of around 10° C., a flow rate reduction of FR1 (around 140 mL/min) can be applied while still maintaining the flow rate above AF. The configuration S0 may be referred to a first suction configuration, and the configuration S4 may be referred to as a second suction configuration. At an operating temperature of around 10° C. (which, for the purposes of this comparison, may be referred to as a given temperature), the configuration S0 would provide a higher suction level (and associated gutter flow rate) than the suction level provided by the configuration S4. The gutter flow rate associated with the configuration S0 is illustrated by the dash-dot line in FIG. 9, whereas the gutter flow rate associated with the configuration S4 is illustrated by the solid line segment labelled S4. In use, the gutter flow rate control system may thus be configured to cause the suction system to operate in the first suction configuration (i.e. state S0) at a first temperature (i.e. above around 39° C.), and to operate in the second suction configuration (i.e. state S4) at a second temperature (i.e. below around 12)° ° C.

On the other hand, when using ink 1 at an operating temperature of around 30° C., a flow rate reduction of up to FR2 (i.e. around 60 mL/min) can be applied while still maintaining the flow rate above AF. The configuration S2 may be referred to a third suction configuration. At an operating temperature of around 39° C., the configuration S0 would cause a higher suction level (and associated gutter flow rate) than the suction level generated by the configuration S2.

The switching points between different controllable fluid path configurations are selected in the illustrated example to maintain the gutter air flow rate above the air-flow threshold AF at all times. Of course, in some circumstances, this may be appropriate e.g. where the risk of gutter overflow must be minimised. In other circumstances, (e.g. if a smaller safety margin can be tolerated), it may be decided to maintain the gutter air flow rate above an alternative air-flow threshold. It will further be understood that where a printer control system has no knowledge of actual gutter air-flow, or printhead configuration, it may be preferred to perform control on the basis of an assumed worst case configuration, so as to minimise, or at least reduce, the risk of gutter failure.

In some circumstances it may be preferable to distribute the different flow restriction options in a nonlinear fashion. For example, if a printer is expected to normally operate within a particular temperature range (for example between temperatures 10° C. and 20° C.) but is also required to be able to operate in exceptional circumstances up to 40° C., it may be desirable to provide a large number of selectable flow rate options that are suitable for use within the 10-20° C. range, with a single maximum flow rate option being provided for all temperatures above 20° C.

More generally, it will be appreciated that the gutter air-flow level is maintained closer to a uniform level for different temperatures than if the gutter flow rate control system was not provided. The gutter flow rate control system can therefore been seem to control the air flow rate, or to regulate it. Further, the gutter flow rate control system can be considered to control the air flow rate so as to be relatively insensitive to temperature.

In further embodiments, alternative controllable fluid path arrangements may be used. For example, a single two port valve may be used in a single restricting flow line (as shown in FIG. 2). Alternatively, two, or even four or more, independently controllable and parallel fluid path portions may be used.

In a further alternative arrangement, a forked arrangement may be used in which a first controllable valve is combined in series with a forked path, with at least one of the downstream forks being separately controllable, allowing at least three different levels of flow restriction to be implemented.

For example, as shown in FIG. 10 a second controllable fluid path assembly PA2 comprises a first valve V4, with an intermediate branch point C providing two downstream sub-paths P4 and P5, each of which has a respective restriction R4, R5. Sub-path P5 is further provided with a further valve V5, allowing that branch to be separately controlled. In this way, two different restriction levels can be provided (i.e. R4 and R4 & R5) in addition to a completely blocked path.

Of course, any number of valves may be combined in series or in parallel, with different branches provided to allow different overall restriction levels.

In yet further alternative arrangements, more complex (e.g. multi-way) valves can be used. For example, a 3/2 valve (i.e. a 3-port, 2-state valve) can be used to select between different configurations, each configurations comprising different flow path portions being selected.

As shown in FIG. 11, a third controllable fluid path assembly PA3 is shown comprising first and second 3/2 valves V6, V7 which are provided to allow selection between one of sub-paths P6 (with restriction R6), P7 (with restriction R7) and P8 (no further restriction), each of which has a different overall restriction level.

It will also be appreciated that in any configuration the valves themselves may also partially restrict the flow rate, and may therefore be selected or used for that purpose as well as providing a switching function. Indeed, the geometry of a particular type of value may provide an easily characterised flow restriction when in each of several different configurations. Thus, valves may be configured to provide a fluid path that can be configured to provide a path through one valve, two valves, three valves etc., with each configuration having a different overall restriction level.

Similarly, the conduits connecting valves may have an appreciable restricting effect. As such, a path (or sub-path) without a dedicated restrictor may still be considered to provide a restriction. Indeed, the restrictors in various ones of the fluid path assemblies shown above may be omitted in some examples, with a controlled (and generally excess) length of conduit providing the necessary restriction.

Further, one or more variable flow rate restrictions may be used (either instead of, or in combination with, one or more valves).

In some embodiments, one or more valves may be regularly switched between different states (e.g. open and closed, sub-path 1/sub-path 2) in order to provide an effective restriction level that is different than that of either state. For example, by switching between a first state which resulted in a gutter flow rate of 100 mL/min and a second state which resulted in a gutter flow rate of 180 mL/min an effective state which resulted in a gutter flow rate of around 140 mL/min could be achieved if the switching duty cycle was around 50%. By using pulse width modulation (PWM), it may be possible to combine different states in this way, with the switching duty cycle being varied to provide a control over the effective restriction level. A switching frequency of between around 5 and 10 Hz may be used in some systems. It will be appreciated, however, that the switching frequency will depend on various factors, such as, for example, the length of gutter line 69. A longer gutter line may facilitate a lower switching frequency (since it will effectively damp the effect of the change in applied vacuum level). Moreover, it will be understood that the gutter line may gradually fill with ink when a lower flow rate is applied, and then be cleared of ink when the higher flow rate is applied. Thus, a longer gutter will take longer to fill than a shorter gutter.

In a further alternative, the controllable ink path $P_{A4-B1}$ may be provided by inserting a 3/2 valve at point A4 within the purge line 58. In a first configuration the ink flowing from the printhead 5 may pass to the ink feed tank 17 (as is consistent with normal operation). In second configuration the ink flowing from the printhead 5 may be diverted to from the point A4 to the point B1 described above. That is, the ink flowing along the purge line 58 may be diverted to flow to a suction port of the Venturi 73, thereby reducing the gutter suction. The valve in such an arrangement could be switched between a normal (high gutter flow rate) state and a switched (low gutter flow rate) state when required. Such an arrangement could also be operated via PWM control. Alternatively, or in addition, various restrictions or flow path branches could be provided to control the rate of ink flowing to the suction port 78 to a desired level.

Many combinations of different types of valve, flow restriction and switching control scheme can be provided as required in order to deliver a desired number and level of flow restriction options. It will be understood that the particular fluid flow arrangements selected may be chosen by the system designer in accordance with a desired number and level of different gutter flow rate options.

Generally speaking, the extent of restriction required will also depend upon the locations of the points A and B. In particular, in view of system losses (e.g. friction), the closer to the suction port 78 the controllable fluid path P joins the gutter line 69, the higher the restriction fluid flow rate required to provide the same reduction in suction force. As such, by providing the entry point B1 close to (or even at) the suction port 78, it is possible to implement a flow rate control system with reduced tolerance requirements on flow restrictors resulting in an easier, and possibly cheaper, manufacturing process. As such, it may be desirable to configure the controllable fluid path P so as to enter the gutter flow line 69 as close as possible to the suction port 78.

In alternative embodiments, the point B at which the controllable fluid path P terminates may be at a second suction port provided by the Venturi 73.

On the other hand, it may be preferred to configure the controllable fluid path P to terminate at a point B2 (see FIG. 2) which is some distance (e.g. 500 mm of conduit) from the suction port 78. The preferred location will depend on many factors, and can be determined by empirical studies, and by taking into account other system constraints (e.g. ease of access to gutter line junction points or Venturi). Generally speaking, the point B will be provided within the housing 3 (rather than in the printhead 5).

In some circumstances, it may be possible to retrofit a controllable fluid path assembly to an existing printer. In such cases, installation convenience may result in a configuration which is different to one that has been designed to be optimal.

It will further be understood that the location from which the controllable fluid path P begins (i.e. the point A), will also have an impact on the flow along the controllable fluid path P. In particular, if the flow path begins at point A1, which experiences a slightly higher than atmospheric pressure, a slightly higher restriction (e.g. a narrower/longer bore) may be required as compared to the point A2, which begins at a location within the ink feed tank 17 which is at a pressure closer to ambient pressure. Alternatively, if the controllable fluid path begins at point A3, which is at a higher pressure than either of points A1 or A2, then a greater degree of restriction may be required than either of the first and second locations A1, A2 to achieve the same flow rate.

It will further be appreciated that alternative locations for the beginning A and end B of the controllable fluid path may be provided as required.

For example, in some circumstances the point A may be located in the ink pick up line 19 (i.e. upstream of the pump 21). In such cases, careful ink pressure management may be required so as to ensure the negative pressure provided by the pump 21 does not overwhelm the negative pressure supplied by the Venturi 73.

Generally speaking, the controllable fluid path P is configured to allow ink to flow from a point within the printer within an ink recirculation path. That is, in each of the arrangements described above, the point A is within an ink flow loop along which ink flows and is continually replenished due to ink recirculation (e.g. via an ink supply line, purge line, or Venturi). The point A is, generally speaking, provided at a location within the printer other than an ink cartridge (or supply line connected directly to an ink cartridge), since such a location will contain a limited ink supply, and may, at times, be empty. On the other hand, many locations within the printer contain ink that is continually replenished.

In an alternative arrangement, the fluid that is recirculated to the suction port 78 may be air. For example, the connection at point A2 within the ink feed tank may be configured to draw air into the path P, and controllably provide this fluid to the suction port 78. In this way, the rate of fresh air drawn into the gutter may be controllably reduced. It will be understood, however, that in such an arrangement, care may be required to ensure that only air was drawn in, since the gutter flow suppression effect of liquid and gas being provided along the path P would be significantly different. It will also be appreciated that where air is used as the gutter flow control fluid, different restrictions may be required than if ink is used. For example, a restrictor of around 15 mm in length with a diameter of around 0.2 mm may be appropriate in a particular example. It will further be understood that other locations may be used to provide air for recirculation. One example of such a location is the capture tank 80, while another is the tube connecting the capture tank 80 to the ink feed tank 17. While it is known to provide solvent saturated air to the gutter return line 69 at a location close to the gutter opening (for example as described in GB 2,447,919), such fluid flow is not performed in a controllable way (e.g. in dependence upon temperature). Moreover, such a configuration is only known in-so-far-as the recirculated air is provided close to the gutter opening. In the present system, the recirculation entry point B is preferably (although not necessarily) close to the suction port, and is typically provided within the housing 3 (i.e. rather than within the printhead 5).

Alternatively, or in addition to the controllable fluid path configurations described above, the gutter flow rate control system may be configured to control the gutter flow rate in other ways.

For example, in an embodiment a controllable fluid path comprising a controllable restriction may be provided within the gutter line 69. Such a controllable restriction may comprise a valve configured to alter a restriction experienced by the gutter line, or simply involve a variable restriction provided within the gutter line 69. Such a restriction can be controlled on the basis of temperature data (or some other form of control input) in order to control or regulate the rate of fluid flow along the gutter line 69.

In further alternative arrangements, the gutter flow rate can be controlled in yet other ways.

For example, the rate of ink flowing through the Venturi could be adjusted. By reducing the flow of ink through the Venturi, the suction force generated by the Venturi is reduced, and therefore the gutter flow rate would also be reduced (and vice versa for an increase in ink flow rate). Ink flow through the Venturi could be varied by use of a variable restriction (e.g. a needle valve) provided in the Venturi supply line 75 (e.g. at point A3).

Alternatively, ink flow through the Venturi could be varied by controlling the ink flow from the Venturi supply line 75 in such a way that the pressure at the Venturi inlet was reduced (e.g. by including a fixed flow restriction prior to any controllable fluid path, so as to form a pressure potential-divider).

In a further alternative, ink flow through the Venturi could be varied by providing a controllable fluid path assembly PA (e.g. of the sort shown in FIG. 8, 10 or 11, or variants thereof) in series with the Venturi (e.g. at point A3). In this way, a controllable restriction would be applied in series with the Venturi, allowing a controllable reduction in inlet pressure, and therefore a controllable reduction in suction pressure, to be generated.

In a yet further alternative, multiple Venturis with either different or the same design parameters could be switchably combined (e.g. in parallel) to achieve a similar overall effect to that described above. In combination, multiple Venturis may be referred to as a suction system.

In one such arrangement, one Venturi could be operated for a low gutter suction level, with a second Venturi being operated in addition to the first for high suction level (i.e. at higher operating temperatures). The first and second Venturis may be supplied with ink continuously by two branches from Venturi supply line 75 (e.g. by branching at location A3). A branch may be taken from the gutter line (e.g. at location B2) and connected to a suction port of the second Venturi with a valve being provided to selectively connect the vacuum to the gutter line 69.

Two (or more) Venturis could be operated in this way to provide alternative suction levels. For example, a two-way valve (or more) could be installed at location B2 to allow selection between the different suction levels.

Alternatively, a plurality of Venturis could be controllably operated by introducing a valve prior to the main ink inlet of one or more of the Venturis. By preventing (or reducing) the flow of ink through the one or more Venturi(s), the suction force generated by that Venturi would be eliminated (or reduced), and therefore gutter flow rate would be reduced. If the ink flow through one or more Venturis was valve controlled in this way, pressure disturbances generated by such switching could be mitigated by appropriate configuration of the damper 25, or by controlling the switching to occur at a time when ink pressure fluctuations would not be problematic. It is noted, however, that care should be taken to minimise pressure variations at the droplet generator 55.

Various suitable controllable fluid flow path configurations will be apparent to one of appropriate skill in the art.

Generally speaking, the extent to which it may be appropriate for any flow restriction or flow rate reduction (however implemented) to be applied can be determined in a number of ways. For example, empirical studies can be performed for a particular printer configuration at a variety of temperatures, and with a variety of inks so as to determine the air flow rate along the gutter line in each situation. Furthermore, it would be known (e.g. empirically) that a particular rate of gutter air flow is required in order to effectively remove all ink entering the gutter line from the ink nozzle.

By measuring the (maximum) gutter flow rate at a low temperature, it is possible to determine the extent to which a flow restriction may be applied for a given ink at a given temperature with a given Venturi configuration. It may then be possible to implement a controllable fluid path, or other form of gutter flow rate control system, in order to provide a convenient choice of different flow configurations which can be selected between according to an operating temperature and ink combination. That is, higher levels of gutter flow rate reduction will typically be appropriate at a lower temperatures, with the flow reduction amount reducing as temperature increases. It will be understood, however, that additional factors may also be used to determine an appropriate flow rate reduction, and that a best possible flow rate reduction may be not applied in all circumstances.

It will be understood that the benefit achieved by the gutter flow rate control system will be affected by the extent to which the solvent loss is reduced at any given time, and the proportion of the time for which the saving is applied. The extent of flow rate reduction can be modified or tuned to provide an optimal overall system performance.

As described above, the restriction configuration may be selected on the basis of temperature data. In some circumstances the controller 84 (either as part of controller 81, or provided separately) may be configured to receive temperature data from the temperature sensor 85 (or another source) and to generate control signals for the controllable fluid path assembly PA (or other gutter flow rate control system) on the basis of the received temperature signals. In some embodiments, data indicative of an ambient temperature (e.g. as obtained from a factory control system) may be used to determine an approximate ink temperature data.

A known offset or calibration relationship (e.g. as determined by reference to a stored relationship) may exist between an ambient temperature or a temperature at a location within printer (e.g. within the housing) and temperature of the ink flowing through the Venturi 73, with the controller 84 processing received temperature data to obtain data indicative of ink temperature, which can be used to control the gutter flow rate control system.

In this way the controller 84 may automatically control the controllable fluid path assembly PA in order to achieve a performance enhancement (or performance reduction if the performance of the Venturi 73 is to be considered).

The controller 84 may be configured to control the level of restriction of the controllable path P on the basis of a relationship stored within a memory 87 associated with the controller 81 (e.g. in a look-up table). The relationship may be a relationship between temperature and the appropriate gutter flow rate control system configuration. For example, the stored relationship may comprise a plurality of configuration settings and associated switching temperature thresholds for a given ink type. It will be appreciated that where gutter flow rate is controlled on the basis of an expected relationship between flow rate (or Venturi performance) and temperature, some margin of error may be included, so as to accommodate non-ideal behaviour, or system performance deterioration (e.g. due to ink residue build-up within the gutter, blocked vents, pump performance degradation, etc.).

In a further alternative arrangement, the stored relationship may comprise a plurality of configuration settings and associated gutter flow rates. For example, the relationship may comprise data indicative of a plurality of available settings. If it is determined (e.g. by monitoring the rate of gutter flow) that there is an excess gutter flow rate (e.g. the gutter flow rate is in excess of the air-flow threshold AF by more than a predetermined amount) a next flow reduction step can be taken, or an increased variable restriction applied. In this way, the gutter flow rate control system can be operated to cause the gutter flow rate to have a gutter flow rate within a target gutter flow rate range. The target gutter flow rate range may comprise a minimum gutter flow rate (e.g. the air-flow threshold AF). The gutter flow rate control system may be configured to cause the gutter flow rate to not drop below the minimum gutter flow rate, and to minimise an excess gutter flow rate above the minimum gutter flow rate.

It will be understood that the memory 87 may store a number of relationships (e.g. one for each of a plurality of ink types), and may access data associated with the relationships in accordance with the selected ink type and current temperature and/or flow rate. Further data may also be stored relating to the current flow configuration, allowing a determination to be made of whether a flow rate increase or decrease should be applied.

In some circumstances, a relationship may not be available for the precise configuration currently selected. In such circumstances it may be possible to control the gutter flow rate control system on the basis of a relationship considered to be most similar to the present configuration, or alternatively to extrapolate from one or more available relationships or settings.

In some circumstances the gutter flow rate control system configuration settings (e.g. temperature set points at which variable flow path P is controlled to switch) may be varied during printer operation. For example, rather than a temperature or flow rate set point being permanently determined, it may be updated based upon historical printer performance. Similarly, system faults occurring regularly when using certain flow rate control settings may be used to vary gutter flow rate control system configuration settings (e.g. by disabling the gutter flow rate control system, or avoiding certain configurations).

Further still, relationships between temperature and switching set points may be monitored, either locally or at a remote server. Data including one or more of ink type, solvent usage, operating temperature, gutter flow rate, gutter flow rate control system settings, and other system parameters may be monitored, recorded and aggregated. Updated flow path control relationships and setting may be generated and provided to remote machines as required. In this way, it is possible to monitor and improve system performance without physically accessing an installed printer.

As described above, the switching between different gutter flow rate control system settings may be performed automatically based upon temperature data. In an alternative embodiment, switching may be performed based upon measurements of vacuum pressure along the gutter line 69, or based upon flow rate data indicative of a rate of flow of fluid along the gutter flow line 69. Such measurements may be performed by a vacuum sensor attached to the gutter line 69, and/or by a flow meter provided within the gutter line 69.

Of course it will be appreciated that such measurements may be relatively unstable, and/or may introduce an additional restriction to the flow line. As such, it may be preferred to rely upon temperature data since the measurement of temperature data does not affect the rate of flow of fluid along the return line, and therefore does not impact operation unnecessarily. The measurement of temperature data also does not introduce additional cost and mechanical complexity.

In a further alternative embodiment, the gutter flow rate control system may be controllable on the basis of a manual control interface. For example, control options provided within the user interface of the printer 1, as accessed via the interface 9, or via a remote control interface, may be provided allowing a user to select a particular configuration setting. Such control may, for example, be performed on the basis of ambient temperature measurements taken by a user, by observing gutter overflow, and/or by reference to configuration guidelines provided by a printer manufacturer. It will, of course, be appreciated that such manual control may be susceptible to malfunction (e.g. if conditions change after a setting has been made, or if an inappropriate setting is applied).

Furthermore, physical control switches may be provided. For example, one or more switches 89 (FIG. 4) may be provided in a user accessible location on the printer housing 3 allowing a user to programme the machine to use a particular controllable fluid path configuration. Such an interface may simply comprise a binary switch (i.e. “on”/“off”), or may allow a selection to be made between a plurality of configurations (e.g. states S0-S7). Alternatively, a printer may comprise an automatic control interface and a manual (e.g. physical) disable switch.

In a further alternative, a control interface or switch for the gutter flow rate control system may be provided at a location within the printer housing 3 which is not accessible during normal printer operations. In such circumstances, the printer housing 3 may be required to be opened (e.g. as for routine maintenance, or during ink or solvent refill operations), to enable the settings to be adjusted.

It will be appreciated that in some circumstances, switching between different gutter flow rate control settings may be required to be performed dynamically, and automatically. However, in other circumstances the extent to which the temperature of operation changes during normal operations is limited. As such, it may be possible for the same setting to be applied for an extended period of time.

In a simple arrangement, it may be possible for a printer to simply have two settings. For example, a "start-up" setting which is configured for use during the first 20 minutes (or other predetermined duration) of printer operation, during which ink temperature will gradually increase. Once ink temperature has reached a normal operating temperature (or a predetermined period has elapsed), the setting may be changed to a different (or variable) gutter flow rate setting.

The gutter flow rate control system may be operated in alternative ways to those described above. For example, the gutter flow rate control system may be deactivated (e.g. controlled to have a first, or disabled, configuration) in certain circumstances (e.g. with an electronic or manual override), or when a predetermined condition is met.

As described above, the gutter flow rate control system will generally result in a reduction in solvent consumption. However, in certain circumstances, increased solvent consumption may be desirable. For example where ink viscosity is considered to be too low (e.g. as determined by viscometer readings), the gutter flow rate control system can be deactivated to allow excess gutter air flow to cause solvent to evaporate at a higher rate than is necessary, thereby bringing ink viscosity back to a desired range. In an embodiment, the gutter flow rate control system can be deactivated (e.g. set to a "normal" setting) when ink viscosity is determined to be a predetermined level (e.g. 0.5 cP/$5\times10^{-4}$ Pa·s) below a target value or target range.

More generally, the gutter flow rate control system can be controlled based upon ink viscosity. For example, the gutter flow rate control system may be deactivated when the ink viscosity is outside a predetermined range. Such operation can be used to minimise the risk of system malfunction and to simplify the control of the gutter flow rate control system. More particularly, Venturi performance is known to vary as a function of ink viscosity. As such, rather than developing complex control relationships to determine appropriate settings based on every possible combination of temperature and viscosity, it may be preferred to operate the gutter flow rate control system only within a predetermined viscosity range. Outside this range, a "normal" (i.e. non-reduced) gutter flow rate may be selected, until the printer has corrected the viscosity (e.g. by adding more solvent if viscosity is too high).

In some embodiments a Venturi may be intentionally over-specified for normal use, providing a gutter flow rate (and associated solvent loss rate) that is higher than would normally be required (or tolerated, for extended periods). Such an arrangement may be preferred since it permits rapid loss of wash-solvent after a shut-down/start-up operation, when additional solvent (e.g. 15 mL per cycle) may be introduced to the ink supply system due to cleaning and purging processes. While ordinarily such an over-specified arrangement may not be desirable (due to the continued excess solvent loss), the gutter flow rate control system described herein can be provided to permit high-solvent loss rate operation to be performed in certain circumstances, such as for a period after each start-up, and/or until a condition is met.

A suitable condition for enabling a gutter flow rate reduction may, for example, be that ink viscosity is at a predetermined level or within a predetermined range. Alternatively, the condition may be the expiry of a predetermined period of time since start-up (which may have been determined to allow excess-solvent to be evaporated). Alternatively, the condition may be related to temperature. For example, the condition may be that a temperature (e.g. ink temperature) has risen by a predetermined amount since start-up, or that a temperature (e.g. a printhead temperature) has achieved at least a target value above ambient (e.g. which may reflect the time taken for the printhead to heat up from cold).

More generally, the condition may be that a temperature (e.g. an ink temperature, a printhead temperature) is within an allowed range of temperatures (either in absolute terms, or relative to an ambient temperature). Such operation may protect against faults occurring due to highly adverse temperature conditions.

The condition may also be related to a fault status of the printer. For example, the gutter flow rate reduction system may be disabled when particular faults or warning conditions exist, since use of a reduced gutter flow rate may make system operation less reliable.

A further condition that could be used to deactivate or control the gutter flow rate control system is a miss-aligned jet (e.g. as detected by a gutter sensor). In such circumstances, increased gutter airflow may be desirable to reduce gutter overflow.

The gutter flow rate control system may also be controlled based upon other system characteristics. For example, in some embodiments, the gutter flow rate control system may be controlled based upon printhead orientation or position (e.g. height above or below the Venturi). Such control may include modified switching set-points, or even deactivation if the system is operated outside a normal operating range. Similar control may be performed on the basis of other system parameters (e.g. umbilical length). Further, one or more gutter flow rate target values (e.g. AF) may be established, and an appropriate one of these can be selected for use based on a current printer configuration.

FIG. 12 shows a control process performed by the controller 81 to control the gutter flow rate control system. At step S10 the controller obtains temperature data D10 (e.g. via temperature sensor 85). Processing then passes to step S12 where the controller obtains configuration data D12 (e.g. data indicating the ink type and/or other operating or configuration characteristics of the printer). Such data may be stored in a memory associated with the controller 81. The configuration data may comprise printer configuration data, such as, for example, printhead location data, umbilical length data, printhead orientation and/or height data.

Processing then passes to step S14 where the controller obtains relationship data D14. The relationship data D14 may comprise a look-up table or other form of data indicating a relationship between the temperature and the gutter flow rate control system settings. For example, the look-up table may comprise switching set-points for the currently in-use ink. The relationship data D14 may be obtained by retrieving stored data from a memory location. Appropriate relationship data D14 may be retrieved based on the configuration data D12. Alternatively, the relationship data D14 may be generated (or modified) based on the configuration data D12.

The relationship data may comprise, or be in some way based on, data indicating a characteristic of the printer. The data indicating a characteristic of the printer may comprise one or more curves (e.g. as shown in FIGS. 5-7), indicating a relationship between the temperature and the gutter flow rate for a given printer configuration. As described in detail above, each characteristic may exhibit a general trend in which, for a given printer configuration, the gutter flow rate decreases with increasing temperature.

Processing then passes to step S16 where the controller determines the most appropriate (or target) gutter flow rate control system settings (e.g. a controllable flow path configuration, a gutter restriction configuration, a Venturi modulation configuration, etc.) based upon the temperature data D10 and the relationship data D14. Finally, at step S18, the determined gutter flow rate control system settings are applied. For example a controllable flow path configuration may be set to the determined or target configuration.

The control process may be referred to as a feed-forward control process. That is, control settings are changed on the basis of an expected change in performance (rather than a measured change in performance).

It will be appreciated that steps can be performed in any suitable order. For example, obtaining the temperature (step S10) may be performed after step S14.

Additionally, in some cases, processing operations may be performed at different times and intervals. For example, the relationship data D14 may be obtained (e.g. retrieved or generated) during a printer configuration or set-up operation, with temperature data being re-obtained at regular intervals during use.

Furthermore processing at various separate processing steps described above may be performed as part of a single process step (i.e. it may not be possible to determine clear boundaries between the processing performed in each step).

Further, the configuration data D12 may comprise data relating to characteristics such as viscosity. As described further above, in certain circumstances, e.g. if a predetermined condition is satisfied, the gutter flow rate control system may be disabled, i.e. a default or 'normal' setting may be selected and active flow rate control may be disabled. In such circumstances, temperature data D10 may be ignored, and the determination at step S16 made to select a default setting.

Alternatively, viscosity data may be actively taken into account, and relationship data obtained which is suitable for use with a particular ink, having a particular viscosity.

The configuration data described above may further (or alternatively) comprise data indicating a system operating pressure. As described above, the ink pump 21 may be configured to supply ink to the printhead at a predetermined system operating pressure, which may be determined based upon the printer configuration (e.g. nozzle geometry). It will be appreciated that different operating pressures will result in different suction levels being generated by the Venturi. As such, the gutter flow rate may be controlled based on system operating pressure data.

As described above, the processing described with reference to FIG. 12 is optional. In some embodiments, no such automatic temperature based control is provided (and if it is provided, it may be disabled).

As a further alternative, rather than determining gutter flow rate settings based on temperature data (step S16), the determination may be based on current settings and gutter flow rate data (e.g. as measured by a gutter flow rate sensor), or pressure data (e.g. as measured by a gutter line pressure transducer). In either case, the determination of settings may be made in order to attempt to maintain the gutter flow rate within a predetermined range, or above a predetermined threshold (e.g. air-flow threshold AF). In such an arrangement, step S10 may obtain flow rate and/or pressure data, rather than temperature data D10. Moreover, a controller of this sort may be configured to operate as a closed-loop controller (e.g. a PI or PID controller), with gutter flow rate data being used as an input, and the controllable fluid path configurations changed in order to maintain the gutter flow rate at (or as close as possible to) a target value.

In general terms, controlling the gutter flow rate control system may comprise determining an appropriate (or target) configuration setting (e.g. with reference to temperature) and then configuring the system (e.g. a controllable fluid path) to have the determined (or target) configuration. The determining could be performed automatically by the controller (e.g. as described with reference to FIG. 12), or by a user. Similarly, the configuring could be performed automatically by the controller (e.g. as described with reference to FIG. 12), or by a user (e.g. via a manual interface).

It will be appreciated that the gutter flow rate control system described above may be suitable for application in new printers. However, the gutter flow rate control system can also be applied to existing printers. Indeed, it will be appreciated that adjustments to the fluid flow path can be relatively minor in certain circumstances, with a gutter flow rate control system being installable by inserting a controllable fluid path between suitable points A and B identified in FIG. 2 (amongst others). In such a retrofitted system, a control interface could be integrated with an existing control interface, or added separately (e.g. via an additional manual switch, or a wirelessly controlled interface).

FIG. 13 shows a method for retro-fitting a gutter flow rate control system of the sort described herein to an existing printer (e.g. of the general sort shown in FIG. 2, but with the controllable fluid path P and controllable fluid path assembly PA not present). At step S20 a printer is provided. At step S22, a controllable fluid path assembly (e.g. as illustrated schematically in one of FIGS. 8, 10, 11) is provided. At step S24, the controllable fluid path assembly is installed into the printer. At step S26, a control interface for the controllable fluid path assembly is installed within the printer (e.g. either by integrating electronic control systems with a printer controller, and/or by providing a manual control interface).

It will of course be appreciated that the controllable fluid path assembly may take any convenient form, and may include a single (possibly variable) restriction for application in one of several locations, or a plurality of restrictions and valves. The assembly may be provided in kit form and assembled as it is installed. The installation may comprise making adaptations to one or more of: the Venturi, the gutter line, the ink supply link, and the ink feed tank.

The temperature based control scheme described above with reference to FIG. 12 may be combined with any suitable gutter flow rate control system (e.g. fluid feedback to the gutter line, Venturi input adjustment, gutter line restriction, multiple Venturi, etc.). Further, automatic control of any of these forms of gutter flow rate control system may be performed without direct reference to temperature (e.g. by sensing gutter flow rate, or pressure).

Similarly, the various forms of gutter flow rate control system described above may each be operated without any form of automatic control if required (e.g. by providing manual controls), or with non-temperature based automatic control.

The temperature based control schemes and/or the controllable fluid path arrangements described above may be used in combination with other solvent use reduction techniques. For example, an inkjet printer may comprise one or more of a condenser for recovering solvent from gutter (or vent line), an air recirculation line providing solvent laden air to a location close to the gutter entrance (e.g. as described in GB 2,447,919), or a gutter flow restriction system to reduce gutter flow rate during periods when no ink is flowing into the gutter line (e.g. as described in GB 2,455,775) and may also be provided with one or more of a temperature based control scheme, a controllable fluid path arrangement, and a Venturi modulation system as described herein.

It will further be appreciated that while a particular form of ink system is described, the gutter flow rate control system can be applied to different printer configurations, provided that at least one Venturi is used to provide gutter suction.

The above described embodiments are intended to be illustrative in nature and are not intended to limit or define the scope of protection. The scope of protection is defined by the claims.

The invention claimed is:

1. A continuous inkjet printer comprising:

an ink supply system;

a droplet generator configured to receive ink from the ink supply system and to produce a jet of ink for printing;

a gutter configured to receive parts of the jet that are not required for printing;

a gutter line connected to the gutter and configured to return unprinted ink to the ink supply system;

a suction system comprising a Venturi having a suction port configured to apply a suction force to the gutter line; and a gutter flow rate control system configured to control a rate of flow of fluid along the gutter line based on temperature;

wherein:

the gutter flow rate control system is configured to cause the suction system to operate in a first suction configuration at a first temperature, and to operate in a second suction configuration at a second temperature, the first temperature being higher than the second temperature, and the first suction configuration and the second suction configuration are configured such that if the suction system was caused to operate in the first suction configuration at the second temperature, the rate of flow of fluid along the gutter would be greater than the rate of flow of fluid along the gutter when the suction system is caused to operate in the second suction configuration at the second temperature.

2. A continuous inkjet printer according to claim 1, wherein the gutter flow rate control system comprises a controllable fluid path having a plurality of fluid path configurations.

3. A continuous inkjet printer according to claim 2, wherein each one of said plurality of fluid path configurations corresponds to a different rate of flow of fluid along the gutter line for a given temperature.

4. A continuous inkjet printer according to claim 2, wherein the controllable fluid path is configured to allow fluid to flow to a suction port of the Venturi.

5. A continuous inkjet printer according to claim 2, wherein the controllable fluid path is configured to allow fluid to enter the gutter return line between the gutter and the suction port.

6. A continuous inkjet printer according to claim 2, wherein:

the printer comprises an ink supply tank; and the controllable fluid path is configured to allow fluid to flow from the ink supply tank to the suction port.

7. A continuous inkjet printer according to claim 2, wherein:

the printer comprises an ink supply tank and an ink supply line configured to transport ink from the ink supply tank to the droplet generator; and the controllable fluid path is configured to allow fluid to flow from the ink supply line to the suction port.

8. A continuous inkjet printer according to claim 1, wherein the gutter flow rate control system is configured to control the suction force generated by the suction system to control the rate of flow of fluid along the gutter line.

9. A continuous inkjet printer according to claim 1, wherein:

the Venturi defines a primary ink flow path from a Venturi inlet to a Venturi outlet and the suction force generated at the suction port has a predetermined relationship with the rate of ink flow along the primary ink flow path; and the gutter flow rate control system is configured to control the rate of ink flow along the primary ink flow path.

10. A continuous inkjet printer according to claim 1, wherein the suction system comprises a second Venturi configured to apply a second suction force to the gutter line; wherein the gutter flow rate control system is configured to control the suction force applied to the gutter line by at least one of the Venturi and the second Venturi.

11. A continuous inkjet printer according to claim 10, wherein the gutter flow rate control system comprises:

a first configuration in which the suction port of the Venturi is coupled to the gutter line and a second suction port of the second Venturi is not coupled to the gutter line; and a second configuration in which the second suction port of the second Venturi is coupled to the gutter line and the suction port of the Venturi is not coupled to the gutter line.

12. A continuous inkjet printer according to claim 1, wherein the rate of flow of fluid along the gutter line is controlled based on at least one selected from:

a temperature of fluid flowing within the Venturi;

a predetermined relationship between the temperature of fluid flowing within the Venturi and the suction force generated by the Venturi;

temperature data;

a signal indicative of temperature generated by a temperature sensor;

ink data;

ink viscosity data;

a system operating pressure;

printer configuration data; and data indicative of a rate of flow of fluid along the gutter line.

13. A continuous inkjet printer according to claim 1, wherein the gutter flow rate control system is configured to switch a configuration of the controllable fluid path between a first configuration and a second configuration at switching frequency, wherein a switching duty cycle is varied to control the rate of flow of fluid along the gutter line.

14. A continuous inkjet printer according to claim 1, wherein the gutter flow rate control system comprises a manual control interface that is to control the gutter flow rate control system via at least one of a remote control interface or an interface of the continuous inkjet printer.

15. A continuous inkjet printer according to claim 1, comprising a controller configured to control the gutter flow rate control system.

16. A continuous inkjet printer according to claim 1, further comprising:

a printhead operable to receive ink from the ink supply system for printing, wherein the printhead comprises said droplet generator and said gutter; wherein said jet of ink is a modulated jet of ink configured to form a stream of individual droplets; wherein said continuous inkjet printer is an electrostatic deflection continuous inkjet printer configured to selectively charge ink droplets within the ink jet and to deflect charged droplets in an electrostatic field; and wherein the continuous inkjet printer comprises;

at least one charge electrode configured to induce charge on ink droplets; and at least one deflection electrode configured to generate said electrostatic field.

17. A continuous inkjet printer comprising:

an ink supply system;

a droplet generator configured to receive ink from the ink supply system and to produce a jet of ink for printing;

a gutter configured to receive parts of the jet that are not required for printing;

a gutter line connected to the gutter and configured to return unprinted ink to the ink supply system;

a suction system comprising a Venturi having a suction port configured to apply a suction force to the gutter line; and a gutter flow rate control system configured to control a rate of flow of fluid along the gutter line, the gutter flow rate control system comprising a controllable fluid path configured to allow ink to flow from a first location within the printer to a second location in fluid communication with the suction port of the Venturi such that an amount of suction force is changed based on delivery of the ink from the ink supply system to the suction port of the Venturi via the controllable fluid path.

18. A continuous inkjet printer according to claim 17, wherein the controllable fluid path is configured to allow fluid to flow from the output of the Venturi to the suction port.

19. A continuous inkjet printer according to claim 17, wherein the gutter flow rate control system is configured to control the rate of flow of fluid along the gutter line based on temperature.

20. A continuous inkjet printer of claim 17, wherein the ink supply system comprises an ink pump, wherein the ink pump is to generate a positive pressure to supply the ink to the droplet generator, and wherein the ink pump is to generate a negative pressure via the controllable fluid path to the suction port of the Venturi to increase the amount of the suction force to the gutter line.

21. A method comprising:

operating a continuous inkjet printer that includes, an ink supply system;

a droplet generator configured to receive ink from the ink supply system and to produce a jet of ink for printing;

a gutter configured to receive parts of the jet that are not required for printing;

a gutter line connected to the gutter and configured to return unprinted ink to the ink supply system; and a suction system comprising a Venturi having a suction port configured to apply a suction force to the gutter line, the suction system having a first suction configuration and a second suction configuration;

wherein operating the continuous inkjet printer comprises, controlling a rate of flow of fluid along the gutter line based on temperature, wherein controlling the rate of flow of fluid along the gutter line based on temperature comprises causing the suction system to operate in the first suction configuration at a first temperature, and to operate in a second suction configuration at a second temperature, the first temperature being higher than the second temperature; and wherein the first suction configuration and the second suction configuration are configured such that if the suction system was caused to operate in the first suction configuration at the second temperature, the rate of flow of fluid along the gutter would be greater than the rate of flow of fluid along the gutter when the suction system is caused to operate in the second suction configuration at the second temperature.

22. A method according to claim 21, wherein operating the continuous inkjet printer comprises:

obtaining temperature data indicative of a temperature of ink flowing within the Venturi; and controlling a rate of flow of fluid along the gutter line based on said temperature data.

23. A method according to claim 22, wherein operating the continuous inkjet printer comprises:

obtaining relationship data indicating a relationship between the temperature data and a configuration of the gutter flow rate control system;

determining a configuration of the gutter flow rate control system based on said temperature data and said relationship data; and configuring the gutter flow rate control system to have the determined configuration.

* * * * *